United States Patent [19]
Johnson

[11] Patent Number: 6,052,670
[45] Date of Patent: Apr. 18, 2000

[54] OBJECT ORIENTED FRAMEWORK MECHANISM FOR AN ELECTRONIC CATALOG

[75] Inventor: Verlyn Mark Johnson, Wykoff, Minn.

[73] Assignee: International Business Machines Corporation, Armonk, N.Y.

[21] Appl. No.: 08/920,455

[22] Filed: Aug. 29, 1997

[51] Int. Cl.[7] .............................. H06L 9/32; G06F 17/30
[52] U.S. Cl. ............................... 705/27; 705/28
[58] Field of Search ................. 395/226, 50, 62, 395/200.11, 200.12, 227, 235, 326, 329, 611, 228, 229, 751, 794, 6; 705/27, 26, 28, 29; 707/100; 704/1; 414/801

[56] References Cited

U.S. PATENT DOCUMENTS

| | | | |
|---|---|---|---|
| 4,943,932 | 7/1990 | Lark et al. | 364/513 |
| 5,057,996 | 10/1991 | Cutler et al. | 364/200 |
| 5,101,364 | 3/1992 | Davenport et al. | 395/152 |
| 5,119,475 | 6/1992 | Smith et al. | 395/156 |
| 5,181,162 | 1/1993 | Smith et al. | 364/419 |
| 5,195,172 | 3/1993 | Elad et al. | 395/50 |
| 5,226,161 | 7/1993 | Khoyi et al. | 395/650 |
| 5,247,693 | 9/1993 | Bristol | 395/800 |
| 5,249,270 | 9/1993 | Stewart et al. | 395/200 |
| 5,257,384 | 10/1993 | Farrand et al. | 395/725 |
| 5,261,080 | 11/1993 | Khoyi et al. | 395/500 |
| 5,274,572 | 12/1993 | O'Neill et al. | 364/550 |
| 5,276,775 | 1/1994 | Meng | 395/55 |
| 5,287,447 | 2/1994 | Miller et al. | 395/157 |
| 5,293,470 | 3/1994 | Birch et al. | 395/135 |
| 5,297,283 | 3/1994 | Kelly, Jr. et al. | 395/650 |
| 5,315,703 | 5/1994 | Matheny et al. | 395/164 |
| 5,367,633 | 11/1994 | Matheny et al. | 395/164 |
| 5,369,766 | 11/1994 | Nakano et al. | 395/700 |
| 5,379,430 | 1/1995 | Nguyen | 395/700 |
| 5,388,264 | 2/1995 | Tobias, II et al. | 395/650 |
| 5,390,325 | 2/1995 | Miller | 395/575 |
| 5,396,626 | 3/1995 | Nguyen | 395/700 |
| 5,398,336 | 3/1995 | Tantry et al. | 395/600 |
| 5,710,887 | 6/1998 | Chelliah et al. | 395/226 |
| 5,740,425 | 4/1998 | Povilus | 395/611 |

OTHER PUBLICATIONS

Text of IBM Technical Disclosure Bulletin, vol. 37, DeBinder et al., Feb. 1994, "Results Folder Framework", pp. 431–432.

Text of IBM Technical Disclosure Bulletin, vol. 36, Coskun, N., Jun. 1993, "Persistent Framework Independent Record/Playback Framework", pp. 261–264.

Text of IBM Technical Disclosure Bulletin, Baker et al., Oct. 1991, "Model View Schema", pp. 321–322.

Text of IBM Technical Disclosure Bulletin, Baker et al., Oct. 1991, "Office Container Class", pp. 309–310.

(List continued on next page.)

*Primary Examiner*—Allen R. MacDonald
*Assistant Examiner*—Pedro R. Kanof
*Attorney, Agent, or Firm*—Martin & Associates, L.L.C.; Derek P. Martin

[57] ABSTRACT

An object oriented framework mechanism provides a straightforward and convenient way to implement an electronic catalog by providing an infrastructure that embodies the steps necessary for a framework consumer to define an electronic catalog by extending the framework to fit a particular electronic catalog environment. The electronic catalog framework includes core classes and extensible classes that allow a framework consumer to implement a desired electronic catalog. The core classes and class relationships define the core function of the framework mechanism. Extensible classes include a catalog class, a content page class, a table of contents page class, an index page class, a content list page class, a cover class, and a jacket class. These extensible classes are extended by a framework consumer to implement a desired electronic catalog environment. The framework provides consistent programmer interfaces over a wide variety of different electronic catalogs, which greatly enhances programmer efficiency and which makes the resultant code much easier to maintain.

64 Claims, 19 Drawing Sheets

OTHER PUBLICATIONS

Text of IBM Technical Disclosure Bulletin, Cavendish et al., Jul. 1991, "Icon Pane Class", pp. 118–119.

Text of IBM Technical Disclosure Bulletin, Baker et al., Jun. 1991, "Distribution List Class", p. 159.

Text of IBM Technical Disclosure Bulletin, Cavendish et al., Jun. 1991, "Object–Oriented Documentation Tool", pp. 50–51.

Text of IBM Technical Disclosure Bulletin, Allard et al., Feb. 1990, "Object–Oriented Programming in C—the Linnaeus System", pp. 437–439.

Text of IBM Technical Disclosure Bulletin, vol. 38, No. 1, Jan. 1995, pp. 411–414, J. Knapman, "Generating Specific Server Programs in Distributed Object–Oriented Customer Information Control System".

Text of IBM Technical Disclosure Bulletin, vol. 37, No. 12, Dec. 1994, pp. 19–20, Al–Karmi et al., "Events Set for Event Tracing in Distributed Object–Oriented Systems".

Text of IBM Technical Disclosure Bulletin, vol. 37, No. 12, Dec. 1994, pp. 375–378, Acker et al., "Automatically Generating Formatted Documentation for Object–Oriented Class Libraries".

Text of IBM Technical Disclosure Bulletin, vol. 37, No. 11, Nov. 1994, pp. 71–72, Behrs et al., "Device Support Framework to Support ISO DPA 10175 and POSIX 1387.4".

Text of IBM Technical Disclosure Bulletin, vol. 37, No. 7, Jul. 1994, pp. 145–146, Banda et al., "Exception Management Algorithm for Multi–Threaded Method Invocation".

Text of IBM Technical Disclosure Bulletin, vol. 37, No. 6B, Jun. 1994, pp. 553–556, Gest et al., "Portable Object–Oriented Event Manager".

Abstract for WIPO Patent Application No. WO 95/04966, F. T. Nguyen, Feb. 16, 1995, "Automatic Management of Components in Object–Oriented System".

Abstract for U.S. Patent No. 5,388,264, Milne et al., Feb. 7, 1995, "Object–Oriented Framework System for Enabling Multimedia Presentation with Routing and Editing of MIDI Information".

Abstract for WIPO Patent Application No. WO 94/23364, Heninger et al., Oct. 13, 1994, "Framework Processing Apparatus for Application Software".

Abstract for U.S. Patent No. 5,369,766, Heninger et al., Nov. 29, 1994, "Object Oriented Application Processing Apparatus".

Abstract from WIPO Patent Application No. WO 9422081, Sep. 29, 1994, "Hardware–Independent Interface for Interrupt Processing", G. O. Norman et al.

Abstract for WIPO Patent Application No. 94/19752, Anderson et al., Sep. 1, 1994, "Concurrent Framework Processing Apparatus for Two or More Users".

Abstract for WIPO Patent Application No. 94/19751, Anderson et al., Sep. 1, 1994, "Concurrent Framework Processing Apparatus for Application Users".

Abstract for WIPO Patent Application No. 94/19740, Goldsmith et al., Sep. 1, 1994, "Framework Processor of Object–Oriented Application".

Abstract for WIPO Patent Application No. 94/15286, Goldsmith et al., Jul. 7, 1994, "Object–Oriented Framework for Object Operating System".

Abstract for WIPO Patent Application No. 94/15282, Anderson et al., Jul. 7, 1994, "Dialog System Object–Oriented System Software Platform".

Abstract for WIPO Patent Application No. 94/15281, Anderson et al., Jul. 7, 1994, "Atomic Command Object–Oriented System Software Platform".

Abstract for WIPO Patent Application No. 9415285, Jul. 7, 1994, "Object–Oriented Notification Framework System", D. R. Anderson et al.

Abstract for U.S. Patent No. 5,119,475, Schoen et al., Jun. 2, 1992, "Object–Oriented Framework for Menu Definition".

Abstract No. 95–091003/12, "Flexible Multi–Platform Partitioning for Computer Applications in Object Oriented System".

Abstract for WIPO Patent Application No. 95/01610, Koko et al., Jan. 12, 1995, "Object Oriented Product Structure Management in Computer–Aided Product Design".

Abstract for WIPO Patent Application No. 95/04967, Feb. 16, 1995, "Access Method to Data Held in Primary Memory Based Data Base".

Abstract for WIPO Patent Application No. 95/02219, Helgeson et al., Jan. 19, 1995, "Distributed Computation Based on Movement, Execution and Insertion of Processes in Network".

Abstract from U.S. Patent No. 5,371,891, "Object Constructions in Compiler in Object Oriented Programming Language", J. Gray et al., Dec. 6, 1994.

Abstract from EPO Patent Application No. EP 622730, "Encapsulation of Extracted Portions of Documents Into Objects", M. A. Malamud, Nov. 2, 1994.

Abstract for EPO Patent No. 619544, S. Danforth, Oct. 12, 1994, "Language–Neutral Object–Oriented Programming".

Abstract for WIPO Patent No. 94/20912, Sep. 15, 1994, "Object–Oriented System for Managing Financial Instruments".

Inspec Abstract No. C9504–7460–043, Sells et al., 1995, "Implementation of the Architecture for a Time–Domain Dynamical System Simulation in a Very High–Level Pictorial Object–Oriented".

Inspec Abstract No. C9504–7460–042, Coleman et al., 1995, "An End–to–End Simulation of A Surveillance System Employing Architecture Independence, Variable Fidelity Components and Software Reuse".

Inspec Abstract No. C9503–6140D–045, Satoh et al., 1995, "Process Algebra Semantics for a Real Time Object Oriented Programming Language".

Inspec Abstract No. C9501–7160–020, C. Le Pape, 1993, "The Cost of Genericity: Experiments With Constraint––Based Representation of Time–Tables".

Inspec Abstract No. C9501–6140D–005, S. Vinoski, 1994, "Mapping CORBA IDL Into C++".

Inspec Abstract No. C9501–7330–007, Salminen et al., 1994, "Modelling Trees Using an Object–Oriented Scheme".

Inspec Abstract No. C9412–6110B–221, Berghel et al., 1992, "A Generic Object–Oriented Concurrency Mechanism for Extensibility and Reuse of Synchronization Components".

Inspec Abstract No. B9412–6210Q–016, from Oingzhong et al., 1992, "An Object–Oriented Model for Ingelligent Networks".

Inspec Abstract No. C9412–7810–003, from Jung et al., 1993, "Development of an Object–Oriented Anthropometric Database for an Ergonomic Man Model".

Inspec Abstract No. C9412–6110J–014 from Griss et al., 1994, "Object–Oriented Reuse".

Inspec Abstract No. C9411–6130B–108, from Mili et al., 1992, "Building a Graphical Interface for a Reuse–Oriented CASE Tool".

Inspec Abstract No. C9411–7100–029, from C. Le Pape, 1994, "Implementation of Resource Constraints in ILOG Schedule: A Library for the Development of Constraint–Based Scheduling Systems".

Inspec Abstract No. C9411–6115–035, from Mili et al., 1991, "SoftClass: An Object–Oriented Tool for Software–Reuse".

Inspec Abstract No. C9410–6180G–015, from Eichelberg et al., 1993, "Integrating Interactive 3D–Graphics into an Object–Oriented Application Framework".

Inspec Abstract No. B9409–6210M–025, from Hellemans et al., 1994, "An Object–Oriented Approach to Dynamic Service Descriptions".

Inspec Abstract No. C9409–6180–059, from Wang et al., 1993, "A Framework for User Customization".

Inspec Abstract No. C9408–6110B–016, from Chen et al., 1994, "An Experimental Study of Using Reusable Software Design Frameworks to Achieve Software Reuse".

Inspec Abstract No. C9408–7420–021, from Pirklbauer et al., 1994, "Object–Oriented Process Control Software".

Inspec Abstract No. C9408–6110J–011, from Gyu–Chung et al., 1993, "System Methodologies of Object–Oriented Programs".

Inspec Abstract No. C9407–7420D–045, from Desai et al., "Controller Structure Definition Via Intelligent Process Control".

Inspec Abstract No. C9407–6140D–014, from Satoh et al., 1994, Semantics for a Real–Time Object–Oriented Programming Language.

Inspec Abstract No. C9406–6150N–015, from Schmidt et al., 1994, "The Service Configurator Framework: An Extensible Architecture for Dynamically Configuring Concurrent, Multi–Service Network Daemons".

Inspec Abstract No. C9405–6180G–031, from Woyak et al., 1993, "A Motif–Like Object–Oriented Interface Framework Using PHIGS".

Inspec Abstract No. C9403–6180–027, 1991, "An Event–Object Recovery Model for Object–Oriented User Interfaces" from Proceedings of ACMSymposium on User Interface Software & Technology.

Inspec Abstract No. C9504–6130B–049, from A. van Dam, 1995, "VR as a Forcing Function: Software Implications of a New Paradigm".

Inspec Abstract No. C9504–6140D–024, from Sheffler et al., 1995, "An Object–Oriented Approach to Nested Data Parallelism".

Inspec Abstract No. C9503–6110B–045, from Rosiene et al., 1995, "A Data Modeling Framework for Queueing Network Models".

Inspec Abstract No. B9503–8110B–023, from Mautref et al., 1995, "An Object–Oriented Framework for the Development of Interactive Decision Support Systems".

Inspec Abstract No. C9502–7160–026, from Menga et al., 1995, "An Object–Oriented Framework for Enterprise Modelling".

Inspec Abstract No. C9502–6130G–006, "Support for Enterprise Modelling in CSCW", P. Hennessy et al., 1994.

Inspec Abstract No. C9502–7810C–058, from Lin et al., 1995, "Can CAL Software Be More Like Computer Games?".

Inspec Abstract No. C9501–6115–039, from Elia et al., 1993, "G++: An Object Oriented Environment for Developing Distributed Applications".

Inspec Abstract No. C9412–7330–186, from Righter et al., 1994, "An Object–Oriented Characterization of Spatial Ecosystem Information".

Inspec Abstract No. C9412–6160J–025 from J. Livari, 1994, "Object–Oriented Information Systems Analysis: A Comparison of Six Object–Oriented Analysis Methods".

Inspec Abstract No. C9412–6110J–006, from Lau et al., 1993, "Using SOM for Tool Integration".

Inspec Abstract No. C9411–6160J–011, from Odberg et al., 1992, "A Framework for Managing Schema Versioning in Object–Oriented Databases".

Inspec Abstract No. C9406–7490–012, "A Discrete–Event Object–Oriented Modeling Environment for Sawmill Simulation".

Inspec Abstract No. C9406–6115–048, 1993, "Constructing Multi–View Editing Environments Using MViews".

Inspec Abstract No. 4664213, "Maintaining Information about Persistent Replicated Objects in a Distributed System", 1993 IEEE Conference on Distributed Computing Systems.

Inspec Abstract No. C9406–6110J–029, "A Comparison of Object–Oriented Analysis and Design Methods", Proceedings of C++ World 1993.

Inspec Abstract No. C9406–0310F–011, 1993, "Cost–Benefit Analysis of Object–Oriented Technology".

Inspec Abstract No. C9406–6110J–007, from J. D. Grimes, 1993, "Objects 101–An Implementation View", Proceedings of COMPCON 1994.

Inspec Abstract No. 4647921, from Uhorchak et al., 1993, "An Object–Oriented Class Library for Creating Engineering Graphs Using PHIGS".

Inspec Abstract No. 4642214, from Marshall et al., 1992, "Using VDM Within an Object–Oriented Framework".

Inspec Abstract No. 4626386, from Arora et al., 1993, "Building Diverse Environments with PCTE Workbench".

Inspec Abstract No. 4622794, from Campbell et al., 1993, "A Technique for Documenting the Framework of an Object–Oriented System".

Inspec Abstract No. 4618974, from Bowers, 1993, "Some Principles for the Encapsulation of the Behaviour of Aggregate Objects".

Inspec Abstract No. 461931, from Islan et al, 1993, "Uniform Co–Scheduling Using Object–Oriented Design Techniques".

Inspec Abstract No. 4613481, from Thieme et al., 1993, "Schema Integration in Object–Oriented Databases".

Inspec Abstract No. 4603430, from G. Booch, 1994, "Designing an Application Framework".

Inspec Abstract No. 4596323, from Frank et al., 1993, "An Integrated Environment for Designing Object–Oriented Enterprise Models".

Inspec Abstract No. 4593721, Periyasamy et al., 1993, "A Formal Framework for Design and Verification of Robotic Agents".

Inspec Abstract No. 4588839, from L. Fisher, 1993, "Constructing a Class Library for Microsoft Windows".

Inspec Abstract No. 4588834, from G. Olander, 1992, "Chembench: Redesign of a Large Commercial Application Using Object–Oriented Techniques".

Inspec Abstract No. 4566447, from J. Rossazza, 1992, "An Object–Centered Fuzzy Representation".

Inspec Abstract No. 4565630, from Karpovich et al, 1993, "A Parallel Object–Oriented Framework for Stencil Algorithms".

Inspec Abstract No. C9402–6150G–002, from Bruegge et al., 1993, "A Framework for Dynamic Program Analyzers".

Inspec Abstract No. 4550414, from Parrish et al., 1993, "Automated Flow Graph–Based Testing of Object–Oriented Software Modules".

Inspec Abstract No. 4540729, from Bailes et al., "The Ecology of Class Refinement".

Inspec Abstract No. 4534334, from Campbell et al., 1991, "A Technique for Documenting the Framework of an Object–Oriented System".

Inspec Abstract No. 4534330, from Istavrinos et al., 1992, "Experiences with an Object–Oriented Mapper for Coherent Distributed Shared Memory".

Inspec Abstract No. 4528985, from Beneventano et al., 1993, "Taxonomic Reasoning with Cycles in LOGIDATA+".

Inspec Abstract No. 4525743, from Hakimzadeh et al., 1993, "Instance Variable Access Locking for Object–Oriented Databases".

Inspec Abstract No. 4512593, from H. Sakai, 1993, "A Method for Contract Design and Delegation in Object Behavior Modeling".

Inspec Abstract No. B9310–6210L–099, "Templates, Types and Classes in Open Distributed Processing", 1993.

Inspec Abstract No. 4459325, from Kesim et al., 1992, "On the Evolution of Objects in a Logic Programming Framework".

Inspec Abstract No. 4447153, from Klein et al., 1992, "An Object–Oriented Framework for Curves and Surfaces".

Inspec Abstract No. 4426852, from Benveniste et al., 1992, "Concurrent Programming Notations in the Object–Oriented Language Arche".

Inspec Abstract No. 4425343, from Demurjian et al., 1993, "Programming Versus Databases in Object–Oriented Paradigm".

Inspec Abstract No. 4417604, from Kraiem et al., 1992, "Mapping of Conceptual Specifications Into Object–Oriented Programs".

Inspec Abstract No. 4417563, from E. Maim, 1992, "Recognizing Objects from Constraints".

Inspec Abstract No. 4411998, from Yi Deng et al., 1992, "Unifying Multi–Paradigms in Software System Design".

Inspec Abstract No. 4408394, from Allen et al., 1992, "GEM: Global Event Management in CAD Frameworks".

Inspec Abstract No. 4400350, from Y. Shoham, 1993, "Agent–Oriented Programming".

Inspec Abstract No. 4395549, from Hogstrom et al., 1992, "Portability and Data Structures in Scientific Computing–Object–Oriented Design of Utility Routines in Fortran".

Inspec Abstract No. 4391388, from Thomas et al., 1992, "A Generic Object–Oriented Concurrency Mechanism for Extensibility and Reuse of Synchronization Components".

Inspec Abstract No. 4387201, from Chu et al., 1992, "A Pattern Based Approach of Integrating Data and Knowledge to Support Cooperative Query Answering".

Inspec Abstract No. 4366189, from Holt et al., 1992, "A Framework for Using Formal Methods in Object–Oriented Software Development".

Inspec Abstract No. 4356300, from Bertino et al., 1993, "Path–Index: An Approach to the Efficient Execution of Object–Oriented Queries".

Inspec Abstract No. 4341376, from Bertino et al., 1992, "Optimization of Object–Oriented Queries Using Path Indices".

Inspec Abstract No. 4331060, from Lau et al., 1992, "An Object–Oriented Class Library for Scalable Parallel Heuristic Search".

Inspec Abstract No. 4318465, from P. Madany, 1992, "Object–Oriented Framework for File Systems".

Inspec Abstract No. 4302722, from Eggenschwiler et al., 1992, "ET++SwapsManager: Using Object Technology in the Financial Engineering Domain".

Inspec Abstract No. 4298324, from S. Nichol, 1992, "Extending Turbo Vision".

Inspec Abstract No. 4297404, from Tanaka et al., 1992, "Two–Level Schemata and Generalized Links for Hypertext Database Models".

Inspec Abstract No. 4287814, from Natarajan et al., 1992, "Issues in Building Dynamic Real–Time Systems".

Inspec Abstract No. 4281362, from Marshall et al., 1991, "Using VDM within an Object–Oriented Framework".

Inspec Abstract No. 4275707, from Tsukamoto et al., 1991, "DOT: A Term Representation Using DOT Algebra for Knowledge–Bases".

Inspec Abstract No. 4275698, from Van den Bussche et al., 1991, "Evaluation and Optimization of Complex Object Selections".

Inspec Abstract No. 4275693, from Giannotti et al., 1991, "Non–Determinism in Deductive Databases".

Inspec Abstract No. 4270361, from Artale et al., 1991, "Introducing Knowledge Representation Techniques in Database Models".

Inspec Abstract No. 4270125, from Becker et al., 1991, "Reusable Object–Oriented Specifications for Decision Support Systems".

Inspec Abstract No. 4258492, from M. Ball, 1992, "Inside Templates: Implementing C++ Strategies".

Inspec Abstract No. 4258051, from Rundensteiner et al., 1992, "Set Operations in Object–Based Data Models".

Inspec Abstract No. 4244023, from George et al., 1991, "An Object–Oriented Data Model to Represent Uncertainty in Coupled Artificial Intelligence–Database Systems".

Inspec Abstract No. 4234438, from Madany et al., 1991, "Organizing and Typing Persistent Objects Within an Object–Oriented Framework".

Inspec Abstract No. 4152687, from M. Wolczko, 1992, "Encapsulation, Delegation and Inheritance in Object–Oriented Languages".

Inspec Abstract No. 4117514, from Wuwongse et al., 1991, "An Object–Oriented Approach to Model Management".

Inspec Abstract No. C94204–6110J–017, "Choices, Frameworks and Refinement", R. H. Campbell et al., 1991.

Inspec Abstract No. 4090970, from P. Kougiouris, 1991, "Device Management Framework for an Object–Oriented Operating System".

Inspec Abstract No. 4077440, from A. Mahler, 1991, "Organizing Tools in a Uniform Environment Framework".

Inspec Abstract No. 4067033, from Shaw et al., 1990, "Experience with the ET++ Application Framework".

Inspec Abstract No. 4060084, from Muller et al., 1990, "ODICE: Object–Oriented Hardware Description in CAD Environment".

Inspec Abstract No. 4050569, from Di Giovanni et al., 1990, "HOOD Nets".

Inspec Abstract No. C91072815, from Holtkamp et al, 1990, "DEMOM–A Description Based Media Object Data Model".

Inspec Abstract No. C91072016, from A. Lane, 1991, "/DOS/C++–Application Frameworks".

Inspec Abstract No. C91072574, from Hemery et al., "An Analysis of Communication and Multiprogramming in the Helios Operating System".

Inspec Abstract No. C91064787, from Madany et al, 1989, "A Class Hierarchy for Building Stream–Oriented File Systems".

Inspec Abstract No. C91064580, from Gamma et al., 1989, "Integration of a Programming Environment into ET++–A Case Study".

Inspec Abstract No. C91058815, from Menga et al., 1990, "An Environment for Object Oriented Analysis and Prototyping".

Inspec Abstract No. B91052096, from Cusack et al., 1990, "Object–Oriented Specification in LOTOS and Z, or My Cat Really is Object–Oriented!".

Inspec Abstract No. C91053475, from Queinnec et al., 1988, "An Open Ended Data Representation Model for EU–LISP".

Inspec Abstract No. C91053151, from E. Cusack, 1991, "Refinement, Conformance and Inheritance".

Inspec Abstract No. C91042802, from T. Yokoyama, 1990, "An Object–Oriented and Constraint–Based Knowledge Representation System for Design Object Modeling".

Inspec Abstract No. C91041980, from Choi et al., 1991, "Graph Interpretation of Methods: A Unifying Framework for Polymorphism in Object–Oriented Programming".

Inspec Abstract No. C91042655, from Q. Li, 1991, "Extending Semantic Object Model: Towards More Unified View of Information Objects".

Inspec Abstract No. C91024852, from Pierra et al., 1990, "An Object Oriented Approach to Ensure Portability of CAD Standard Parts Libraries".

Inspec Abstract No. C91010951, from T. Helton, 1990, "Level5 Object".

Inspec Abstract No. B90075006, from Gossain et al., 1989, "Designing a Class Hierarchy for Domain Representation and Reusability".

Inspec Abstract No. C91003997, from J. Muys–Yasovic, 1989, "MacApp: An Object–Oriented Application Framework".

Inspec Abstract No. C91004708, from Bertino et al., 1990, "Optimization of Queries Using Nested Indices".

Inspec Abstract No. C900572277, from I. Tervonen, 1990, "Object–Oriented Development as a Multiview Software Construction Methodology".

Inspec Abstract No. C90052627, from Schrefl et al., 1988, "A Knowledge–Based Approach to Overcome Structural Differences in Object Oriented Database Integration".

Inspec Abstract No. C90047457, from Yokoyama et al., 1990, "A Constraint–Based and Object–Oriented Knowledge Representation".

Inspec Abstract No. C90034818, from Q. Chen, 1988, "Extending the Object–Oriented Paradigm for Supporting Complex Objects".

Inspec Abstract No. C90030609, from Forde et al., 1990, "Object–Oriented Finite Element Analysis".

Inspec Abstract No. C90007733, from Weinand et al., 1989, "Design and Implementation of ET++, A Seamless Object–Oriented Application Framework".

Inspec Abstract No. C89062837, from Pasquier–Boltuck et al., 1988, "Prototyping an Interactive Electronic Book System Using an Object–Oriented Approach".

Inspec Abstract No. C89056727, from Campbell et al., 1989, "Principles of Object–Oriented Operating System Design".

Inspec Abstract No. C89056859, from Hull et al., 1989, "On Accessing Object–Oriented Databases: Expressive Power, Complexity, and Restrictions".

Inspec Abstract No. C89049257, from Madany et al., 1989, "Class Hierarchy for Building Stream–Oriented File Systems".

Inspec Abstract No. C89039001, from Brophy et al., 1989, "A Framework for Multiple, Concurrent Graphical Representation".

Inspec Abstract No. C89033226, from Corradi et al., 1988, "PO: An Object Model to Epxress Parallelism".

Inspec Abstract No. C89014870, from R. King, 1988, "Semantic and Object–Oriented Database Support for Software Environments".

Inspec Abstract No. 89003142, from Tenma et al., 1986, "A System for Generating Language–Oriented Editors".

Inspec Abstract No. C88013915, from Woelk et al., 1987, "Multimedia Information Management in an Object–Oriented Databae System".

Inspec Abstract No. C88007447, from P. Allen, 1987, "A Framework for Implementing Multisensor Robotic Tasks".

Inspec Abstract No. C87007043, from Whitted et al., 1986, "Exploiting Classes in Modeling and Display Software".

Inspec Abstract No. C86039588, from K. Fukunaga., 1985; "PROMPTER: A Knowledge Based Support Tool for Code Understanding".

Inspec Abstract No. C86024804, from Greenspan et al., 1986, "A Requirements Modeling Language and Its Logic".

Inspec Abstract No. C84005713, from Meyer et al., 1983, "Towards a Two–Dimensional Programming Environment".

Inspec Abstract No. C81005505, from Mylopoulos et al., 1980, "Some Features of the TAXIS Data Model".

OBJECT ORIENTED FRAMEWORK MECHANISM FOR AN ELECTRONIC CATALOG

FIELD OF THE INVENTION

The present invention relates in general to the data processing field. More specifically, the present invention relates to the field of object oriented framework mechanisms.

BACKGROUND OF THE INVENTION

The development of the EDVAC computer system of 1948 is often cited as the beginning of the computer era. Since that time computers have become indispensable in many fields of human endeavor including engineering design, machine and process control, and information storage and access. In the early days of computers, companies such as banks, industry, and the government would purchase a single computer which satisfied their needs, but by the early 1950's many companies had multiple computers and the need to move data from one computer to another became apparent. At this time computer networks began being developed to allow computers to work together.

Computer networks are capable of performing jobs that no single computer could perform and they allow low cost personal computer systems to connect to larger systems to perform tasks that such low cost systems could not perform alone. In order for computer systems to cooperate in a network to perform some complex job, software must be developed which efficiently delegates parts of the chore or tasks to different computers in the network. One of the recent advances in the field of software development has been the emergence of object oriented programming technology.

The goal of using object-oriented programming is to create small, reusable sections of program code known as objects that can be quickly and easily combined and re-used to create new programs. This is similar to the idea of using the same set of building blocks again and again to create many different structures. The modular and re-usable aspects of objects typically speeds development of new programs, thereby reducing the costs associated with the development cycle. In addition, by creating and re-using a group of well-tested objects, a more stable, uniform, and consistent approach to developing new computer programs can be achieved.

Although object-oriented programming offers significant improvements over other programming types, program development still requires significant amounts of time and effort, especially if no preexisting objects are available as a starting point. Consequently, one approach has been to provide a program developer with a set of pre-defined, interconnected classes that create a set of objects. Such pre-defined classes and libraries are typically called object frameworks. Frameworks essentially provide a prefabricated structure for a working program by defining certain classes, class relationships, and methods that a programmer may easily use by appropriate subclassing to generate a new object-oriented program.

One significant computer network that has recently become very popular is the Internet. The Internet grew out of this proliferation of computers and networks, and has evolved into a sophisticated worldwide network of computer systems. Using the Internet, a user may access computers all over the world from a singie workstation. The widespread acceptance and use of the Internet has prompted businesses to offer a wide variety of products and services via the Internet. Many businesses now offer on-line catalogs that allow a customer to browse through product listings and place an order electronically by selecting products and submitting an order. Other companies offer electronic catalogs on floppy disk or CD-ROM that allow a user to browse through product selections and place an order. Any catalog that is displayed to a user on a computer system is referred to generically herein as an electronic catalog.

Most on-line catalogs are developed using a web document development tool. This approach has several drawbacks. First, using a web document development tool limits the user interface to a format that is accepted for web documents, such as HyperText Markup Language (HTML). If the catalog system has a user interface that is only compatible with web documents, the same user interface could typically not be used for both web and non-web access to the catalog. A separate user interface for non-web access would have to be developed. A second disadvantage of using a web document development tool to develop an on-line catalog is accessing critical data, such as price, product descriptions, etc. There are many different ways this problem may be addressed. The first is to allow the catalog system to access data in specific data storage mechanisms (such as relational databases) where the master copy of the data resides. This solution requires the on-line catalog to build data access programs to access the data in its home location and to possibly convert the data to HTML format. Another alternative is to maintain multiple master copies of critical data in multiple locations and possibly in different formats so that the catalog program can access the data it needs in a know location and in a known format. This solution eliminates the need for special data access programs, since data may be accessed in a local datastore that the catalog may easily access in a known format, but maintaining multiple master databases requires each change to any datastore to be reflected in the others. A third disadvantage of presently known on-line catalogs is that each catalog is typically custom-developed according to the specific needs and requirements of the company, the products offered, etc. As a result, existing on-line catalogs are not well-suited to being adapted to create a new and different on-line catalog. In addition, custom-developing an on-line catalog may require substantial work to convert the on-line catalog to a different form that may be distributed on disk or CD-ROM.

Most electronic catalogs share a host of common functions and features, but there has been no mechanism developed to allow a programmer to take advantage of these similarities in developing an electronic catalog or in developing a tool for creating an electronic catalog. Without a mechanism that can be readily customized and extended to provide an electronic catalog or catalog development tool, companies that provide electronic catalogs will needlessly expend considerable time and resources in developing custom electronic catalogs.

SUMMARY OF THE INVENTION

There is a serious need in the industry for extensible electronic catalogs and catalog development tools. According to the present invention, an object oriented framework mechanism for electronic catalogs provides an infrastructure that embodies the steps necessary for a framework consumer to define an electronic catalog by extending the framework to fit a particular electronic catalog environment. Certain core functions are provided by the framework, which interact with extensible functions. A framework consumer may thus define extensible functions that allow the framework to support many different types of electronic catalogs and functions relating to electronic catalogs.

The framework mechanism of the present invention was designed and constructed using object-oriented technology. Those who are unfamiliar with object-oriented technology, or with object-oriented framework mechanisms, should read the object-oriented overview section of the Description of the Preferred Embodiments section.

DESCRIPTION OF THE PREFERRED EMBODIMENTS

Overview—Object-Oriented Technology

Figure 1:
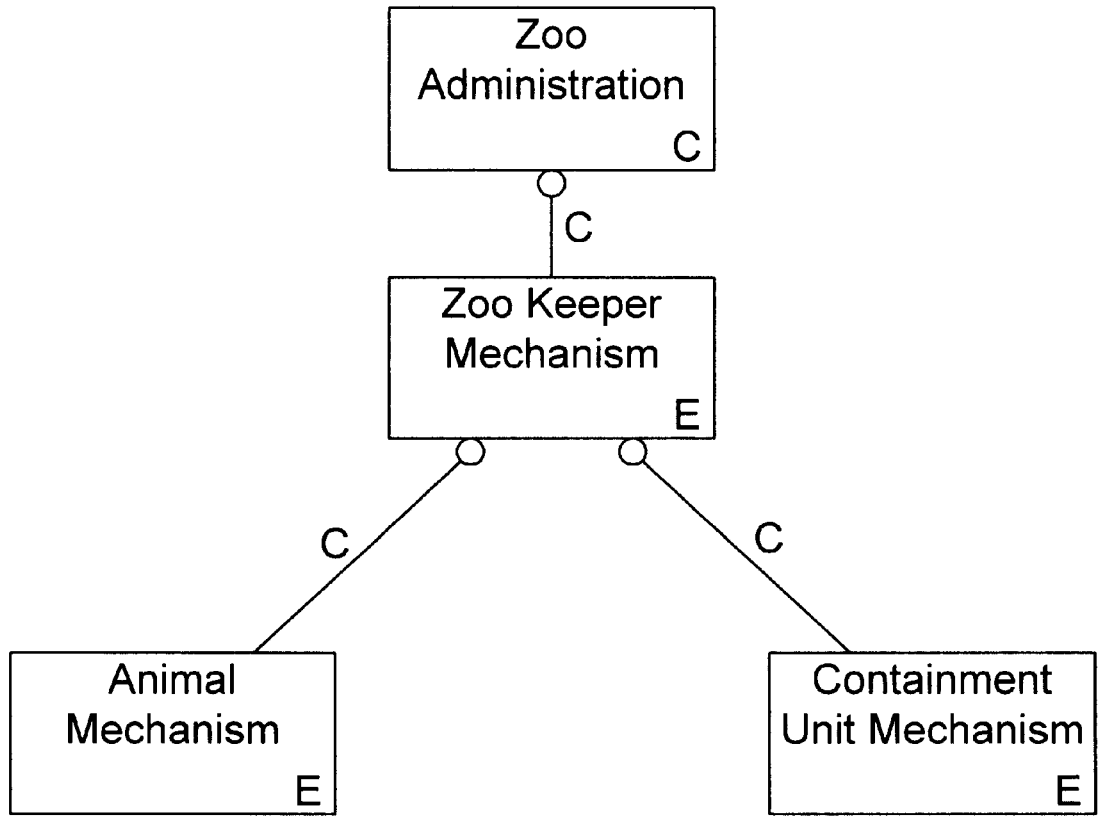
FIG. 1 is a category diagram of an example framework mechanism.

As discussed in the Summary section, the present invention was developed using Object-oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

Object-oriented Technology v. Procedural Technology

Though the present invention relates to a particular OO technology (i.e., OO framework technology), the reader must first understand that, in general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Said another way, OO technology is significantly different from procedural technology because problems are broken down into sets of cooperating objects instead of into hierarchies of nested computer programs or procedures.

The Term Framework

There has been an evolution of terms and phrases which have particular meaning to those skilled in the art of OO design. However, the reader should note that one of loosest definitions in the OO art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

OO Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to framework consumers because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

ZAF—An Illustrative Framework Mechanism

While those skilled in the art appreciate that framework design is necessarily an intertwined and iterative process, example design choices for a simplistic framework mechanism are set forth in the paragraphs that follow. It should be understood, though, that this is only an example framework that is being used in this specification to illustrate and best explain framework mechanisms such that the reader can understand and appreciate the benefits and advantages of the present invention.

Framework designers determine what objects are needed for a framework mechanism by selecting objects from what is called the problem domain. The problem domain is an abstract view of the specific problem at hand. The example problem domain chosen for this illustrative framework mechanism is that of zoo administration. The specific problem is that of designing a mechanism that assists zoo keepers in the care and feeding of zoo animals. In our example of a Zoo Administration Framework (ZAF), an OO framework designer would look to the zoological problem domain and decide that any ZAF would of necessity involve a mechanism that represented the relationship between zoo keepers and animals (i.e., to represent how zoo keepers care for animals). The framework designer would also likely recognize that zoo animals usually live in cages, pens, tanks, and other sorts of containment units. Therefore, our framework designer would start with the idea that the framework would have to involve mechanisms that represented all of these fundamental entities and relationships.

How ZAF is Designed

To begin the design process, our framework designer would likely begin with what is called a category diagram. Category diagrams are used to describe high level framework mechanisms, and how those mechanisms relate to one another. FIG. 1 is a category diagram for the example framework ZAF. The notation used in FIG. 1, and that used in the other figures of this specification, is explained in detail in the Notation section at the end of this specification (pages 21–27). Each mechanism in a category diagram represents groupings of objects that perform a particular function. For the purposes of illustration, assume that our framework designer decides that ZAF should be made up of four high level mechanisms: a zoo administration mechanism, a zoo keeper mechanism, an animal mechanism, and a containment unit mechanism.

As shown in FIG. 1, the zoo administration mechanism has been designed to use the zoo keeper mechanism to administer the zoo. The zoo administration mechanism is therefore said to have a using relationship with the zoo keeper mechanism. (Again, please refer to the notation section of this specification for an explanation of this relationship and the other notation used in this specification.)

As discussed, the zoo administration mechanism has been designed to have responsibility for overall control of ZAF. Accordingly, the zoo administration mechanism is responsible for scheduling the operation of the zoo keeper mechanism. Note also that our framework designer designed the zoo administration mechanism to be a core function of ZAF, which means that it has been designed such that it will not be subject to potential customization and extension. The C in the category box denotes this fact. Please note further that the uses relationship between the zoo administration mechanism and the zoo keeper mechanism has also been designed such that it is not available for ultimate customization by the framework consumer.

The zoo keeper mechanism has been designed to be generally responsible for the care and feeding of the zoo animals. Accordingly, it uses the animal and containment unit mechanisms to perform its tasks. However, unlike the design of the zoo administration mechanism, our framework designer has designed the zoo keeper mechanism to be extensible function, which again means that the zoo keeper mechanism has been designed to be available for modification and or extension by the framework consumer to address future care and feeding requirements. This fact is denoted by the E in the zoo keeper mechanism category box.

Our framework designer has designed the animal mechanism to represent the animal side of the interaction between zoo animals and zoo keepers. Since the animal population in the zoo is something that changes on a regular basis, the animal mechanism has similarly been designed as an extensible function. The containment unit mechanism interacts with the zoo keeper mechanism by representing individual containment units such as pens, tanks, and cages. Like the animal mechanism, the containment unit mechanism has been designed as an extensible function such that it can handle future customization and extension requirements. Please note here, however, that even though the zoo keeper, zoo animal, and containment unit mechanisms have all been designed as extensible function, the relationships between the mechanisms have been designed to be a core function of ZAF. In other words, even though it is desirable to give ZAF's consumers flexibility relative to the zoo keeper, zoo animal, and containment unit mechanisms, it is not desirable to allow ZAF's consumers to change how these mechanisms relate to one another.

Our framework designer would next design the classes and relationships that make up the mechanisms shown on FIG. 1. A class is a definition of a set of like objects. As such, a class can be thought of as an abstraction of the objects or as a definition of a type of object. From the view of a computer system, a single object represents an encapsulated set of data and the operation or a group of operations that are performed by a computer system upon that data. In fact, in a secure computer system, the only access to the information controlled by an object is via the object itself. This is why the information contained in an object is said to be encapsulated by the object.

Each class definition comprises data definitions that define the information controlled by the object and operation definitions that define the operation or operations performed by objects on the data that each object controls. In other words, a class definition defines how an object acts and reacts to other objects by defining an operation or set of operations that is/are performed on the defined data. (Please note that operations are sometimes called methods, method programs, and/or member functions.) When taken together, the defined operation(s) and data are said to be the behavior of the object. In essence, then, a class definition defines the behavior of its member object or objects.

Figure 2:
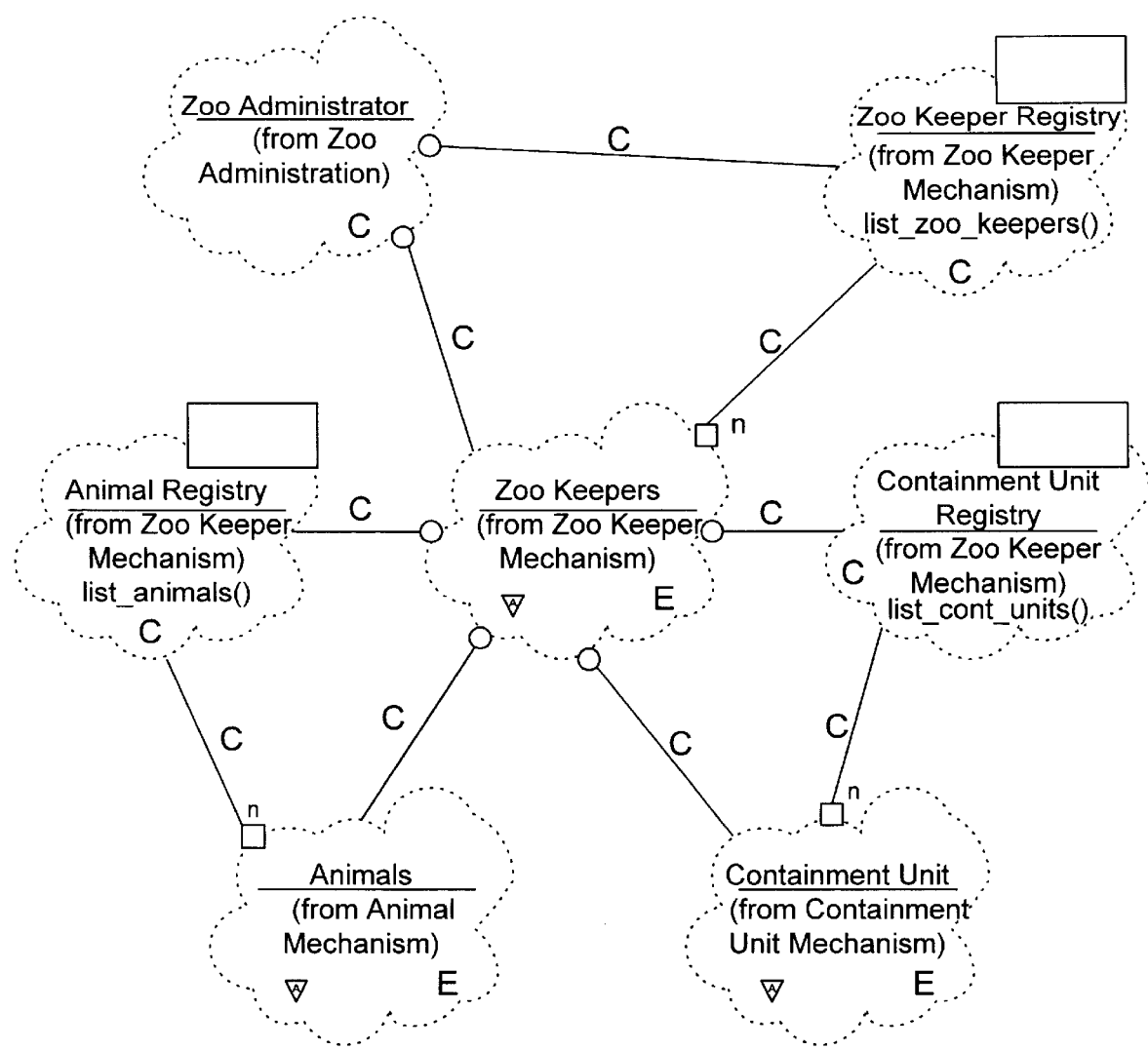
FIGS. 2–6 are class diagrams for the example framework mechanism of FIG. 1.

FIG. 2 is an OO class diagram that shows the fundamental classes that our framework designer has designed for ZAF. Each class representation includes its relationship to the mechanisms shown on FIG. 1. For example, we can see that the zoo keepers class is denoted as being from Zoo Keeper Mechanism. The fundamental classes of ZAF include: the zoo administrator class, which is part of the zoo administration mechanism; the zoo keeper registry class, which is also part of the zoo administration mechanism; the animal registry class, which is part of the zoo keeper mechanism; the zoo keepers class, which is also part of the zoo keeper mechanism; the containment unit registry class, which is also part of the zoo keeper mechanism; the animals class, which is part of the animal mechanism; and the containment unit class, which is part of the containment unit mechanism.

Please note again that the relationships between the classes have been designed as core function of ZAF such that they are not available for ultimate modification by ZAF's consumers.

The zoo administrator class is the definition of the object that is responsible for the overall control of ZAF. Again, OO classes only define the objects that interact to provide a solution to the problem. However, it is by exploring the characteristics of the class definitions that we are able to understand how the objects of the framework mechanism have been designed to provide a living solution that can be customized and/or extended to address future requirements.

The zoo administrator class has been designed to have a uses relationship with the zoo keeper registry. Our framework designer has designed the zoo administrator and zoo registry classes to be a core function of ZAF because our designer has decided that ZAF's consumers should not be allowed to modify the behavior of objects that are members of these class definitions. The zoo keeper registry, which has what is called a contains by reference relationship with the zoo keeper class, is simply a class that defines an object that is a container for all zoo keeper objects. Accordingly, the zoo keeper registry includes a definition for a list_zoo_keepers( ) operation. As will be described later, this operation is responsible for providing a list of zoo keeper objects to other objects that request such a list.

Figure 3:
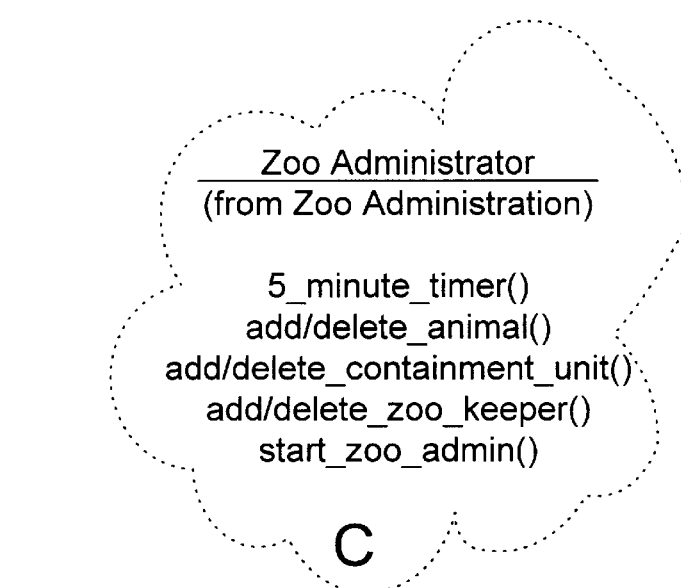

FIG. 3 shows a lower level view of the zoo administrator class. Since objects of type zoo administrator have responsibility for overall control of ZAF, the zoo administrator class has been designed to include operations that perform tasks oriented towards zoo administration. The class definition includes the following five operations: 5_minute_timer( ), add_animal( ), add_containment_unit( ), add_zoo_keeper( ), and start_zoo_admin( ).

The start_zoo_admin( ) operation is responsible for starting ZAF. That is, a user or system administrator will interact with the start_zoo_admin( ) operation to begin administration of a zoo via ZAF. Once started, our framework designer has designed the start_zoo_admin( ) operation to initiate the 5_minute_timer( ) operation. Every five minutes, the 5_minute_timer( ) operation instructs the zoo keeper objects to go out and check on the animals. The add/delete_zoo_keeper operation is responsible for interacting with users of ZAF to define additional zoo keepers (i.e., additional zoo keeper classes), to add additional zoo keepers (i.e., zoo keeper objects), and to remove zoo keeper classes and/or objects. As will become clear in the forthcoming paragraphs, each zoo keeper object is responsible for performing a particular zoo task. Therefore, it is natural that a user of ZAF might well want to add a zoo keeper definition and object to handle an additional zoo task or to remove a definition or object that is no longer needed. As will be seen, this flexibility is provided by designing the zoo keeper mechanism as an extensible function.

Like the add/delete_zoo_keeper operation, the add/delete_animal( ) operation is responsible for interacting with users to define additional zoo animal classes and objects and to remove classes and objects that are no longer needed. Again, it is quite natural for a zoo to need to add and remove animals. The add/delete_containment_unit( ) operation is responsible for the definition of new containment unit classes and objects and for removal of classes and/or objects that are no longer necessary. Again, our framework designer has designed ZAF in a way that provides this flexibility by designing the animal and containment unit mechanisms as extensible functions.

Referring back to FIG. 2, the zoo keepers class definition has a uses relationship with the animal registry, animals, containment unit registry, and containment units classes. Since the value of ZAF is enhanced by allowing ZAF's consumers to customize and extend the zoo keepers, animals, and containment unit classes, these classes have been designed as extensible function. However, changing the behavior of the animal and containment unit registry classes would disrupt the basic operation of ZAF. Therefore, these classes have been designed to be core functions of ZAF.

While the classes and categories within ZAF have been described as either core functions or extensible functions, it is important to note that the term "core function" as used herein broadly relates to requirements that cause the framework to operate in the desired manner. In simple terms, core functions of a framework are the functions that any program that uses the framework will perform. The requirements of core functions may be imposed by the structure of the framework (e.g., by designating certain classes as core functions) or may be imposed by functional requirements that dictate how a framework consumer may utilize the framework. Thus, core functions include not only the classes and class relationships that are designated as core, but may also include extensible classes that must be implemented in particular ways for the framework to function properly. Said another way, while extensible function is that part of the framework that is designed to be customized by the framework consumer, the nature and extent of the customization is governed by the requirements of the framework's core function (i.e., the overall framework function imposed by the structure and functional requirements of the framework). For example, the animals class has been designed as extensible function of ZAF so that ZAF can be customized to accommodate different types of animals. However, the ability to customize the extensible animals class does not imply that the nature of the customization can violate the basic structure imposed by the core function of ZAF (e.g., by customizing the animal class to the extent that it can no longer be reasonably said to represent a type of animal).

Figure 4:
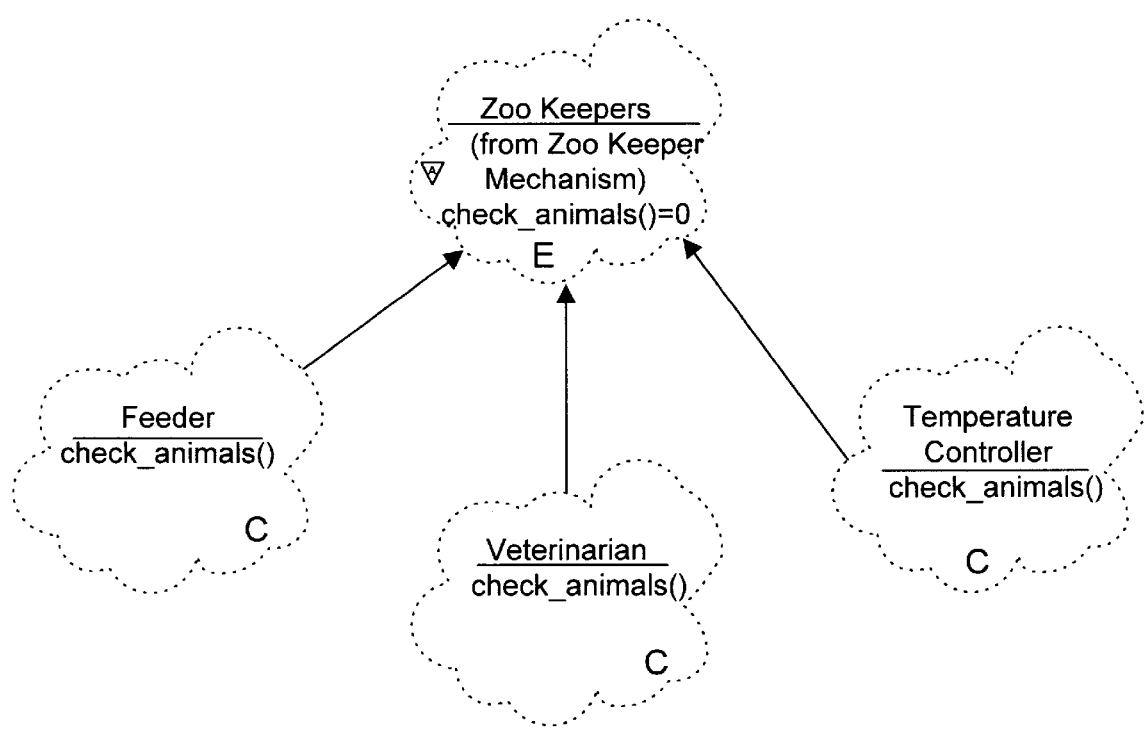

FIG. 4 is a class diagram of the zoo keeper class. However, before describing the details of FIG. 4, it is worthwhile to point out that the class definitions shown on FIG. 4 are ranked in a very simple ordering called a class hierarchy. A class, like the zoo keeper class, that represents the most generalized/abstract class in a class hierarchy is referred to as the base class of the hierarchy. The ordering of classes in a class hierarchy goes from most general to least general (i.e., from general to specific). Less general classes (e.g., the feeder class) are said to inherit characteristics from the more general class or classes (i.e., the zoo keeper class in this case). As such, class definitions feeder, veterinarian, and temperature controller are said to be subclasses of the zoo keeper class. Inheritance mechanisms will be explored in more detail in the discussion associated with FIG. 5.

As shown on FIG. 4, the zoo keeper class definition contains a single operation definition, the check_animals( ) operation definition. The reader should also note that the zoo keepers class definition is marked as being an abstract class. Abstract classes are not designed to have objects created as their members, but are instead used to define a common interface/protocol for their subclasses. A class is said to be an abstract class when at least one of its operation definitions is a pure virtual operation definition. Pure virtual operation definitions are designed for the sole purpose of defining a common interface for subclass definition of that operation. In other words, the design of the actual behavior (i.e., the data and operations) is left to the subclasses themselves. In the case of the zoo keeper class definition, the feeder, veterinarian, and temperature controller subclasses define specific implementations of the pure virtual check_animals( ) operation definition that is contained in the zoo keeper class. An operation is marked as a pure virtual when it is set equal to 0.

It is important to note, though, that the common interface of a pure virtual operation definition must be honored by all subclasses such that requesting objects (called client objects) can use subclass member objects (called server objects) without needing to know the particular subclass of the server object. For example, whenever the object defined by the zoo administrator class needs a particular action performed, it interacts with a zoo keeper object. Because the interface to these objects was defined in abstract, base class zoo keeper and preserved in the subclass definitions for the check_animals( ) operation, the zoo administrator object need not have special knowledge about the subclasses of any of the server objects. This has the effect of decoupling the need for the action (i.e., on the part of the zoo administrator object) from the way in which the action is carried out (i.e., by one of the objects of the zoo keepers subclasses). Designs (like the ZAF design) that take advantage of the characteristics of abstract classes are said to be polymorphic.

Polymorphism is extremely important to OO framework design because it allows the way in which something is done (called the implementation) to be changed or extended without effecting the mechanisms that depend oil the fact the action is actually performed. In other words, client objects need only understand that certain objects perform certain functions, not how those functions are actually carried out. This is one way in which a properly designed framework can be readily customized and extended to satisfy future requirements.

Figure 5:
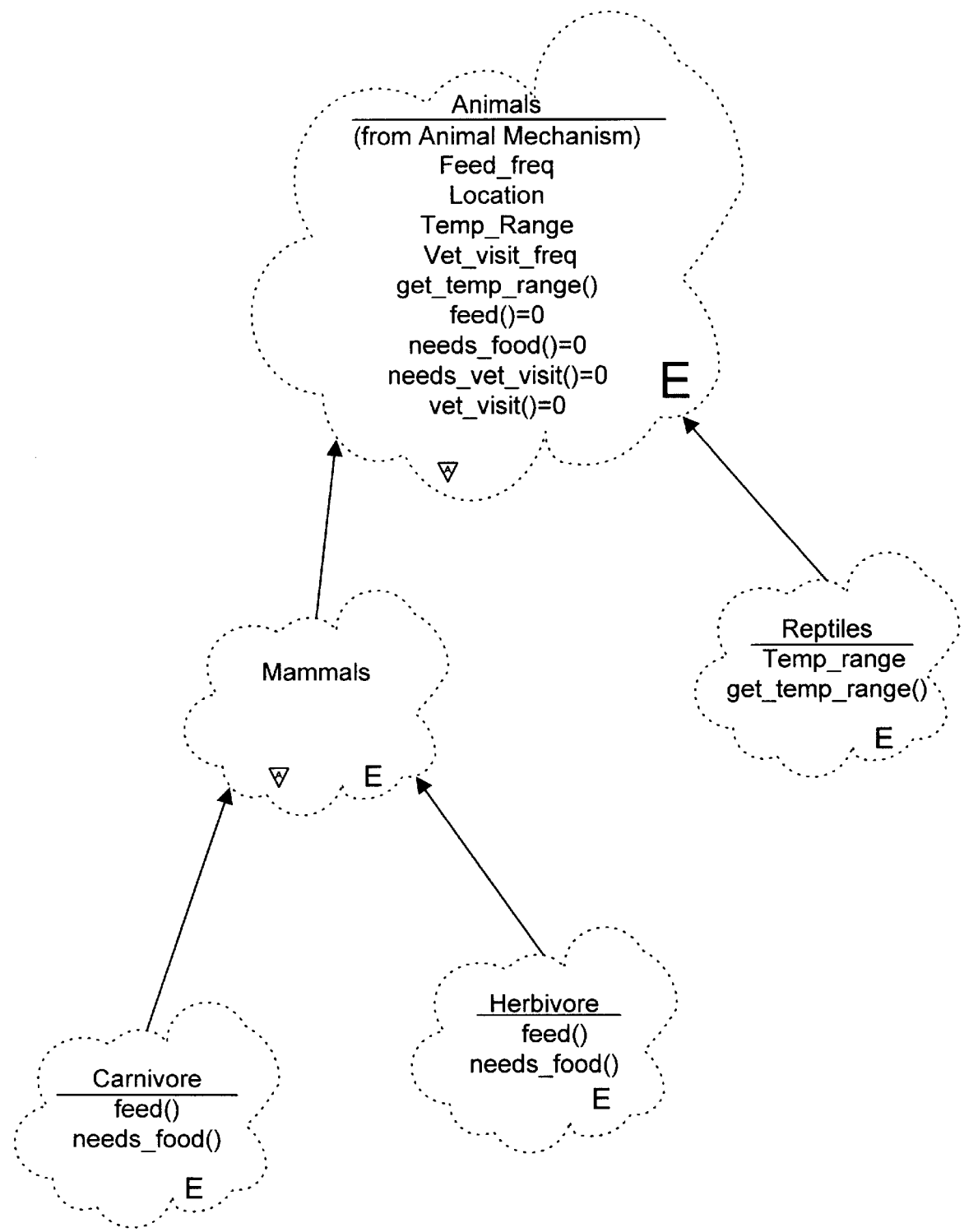

As previously discussed, our framework designer has designed ZAF such that zoo keeper objects interact with animal and containment unit objects to perform their tasks. FIG. 5 is a class diagram for the class hierarchy of the abstract class animal. Since the animals class definition is responsible for representing the characteristics and behavior of zoo animals, the framework designer has designed abstract class animal in a way that reflects this responsibility. As shown, the example animal class definition includes data definitions feed_freq, location, and temp_range and operation definitions get_temp_range( ), feed( ), needs_food( ), needs_vet_visit( ), and vet_visit( ).

For the purposes of this framework overview, it is not necessary to explore each definition in detail. However, the temp_range data definition and the get_temp_range( ) and feed( ) operation definitions are good examples of well thought out framework design choices.

The feed( ) operation definition is designed to perform the actual feeding of the animals (i.e., through specific feeding apparatus which is not shown). The feed( ) operation is a pure virtual operation. Again, this means that the design of the class is such that the actual mechanism that performs the needed function has been left to be defined by the subclasses. Requiring subclass definition is a good design choice in cases like this where objects that are created as members of the subclasses have particularized needs. In ZAF, for example, each type of animal is likely to have need for a particularized feeding apparatus, which not only makes definition of a generic feed( ) operation difficult, but valueless.

By way of comparison, the framework designer has explicitly designed the get_temp_range( ) operation such that it is not a pure virtual operation definition. This means that get_temp_range( ) has been generically defined as a default operation. As such, it is considered a virtual operation. Default operations are used to provide generic function to subclasses. The subclasses can simply use the default operations or they can customize or extend the default operations by redefinition. Redefinition of a default operation is called overriding the default operation.

Mammals is a subclass of class animals, and as such, mammals inherits all of the characteristics of class animals. Please note that class mammals is also designed as an abstract class, which again means that it has not been designed to have objects created as its members, but has instead been designed to provide a common interface for its subclasses. Subclass mammal is further subclassed into classes carnivore and herbivore.

Since definition of the feed( ) operation has been left up to the subclasses, subclasses carnivore and herbivore each have their own definition of the feed( ) operation. Again, this is a good design choice because meat eating carnivores are going to have different needs than their plant eating counterparts.

Temp_range is a data definition for the range of temperatures that coincides with that of the specific animal's natural habitat and the get_temp_range( ) operation definition is designed to retrieve the temp_range for a specific animal and return it to a requesting client object. Subclass reptiles contains its own data definition for temp_range and its own definition for the get_temp_range( ) operation. ZAF has been designed this way to point out that data definitions can be overridden just like operation definitions. Since many reptiles live in desert conditions, where nights can be very cold and days very hot, the default temp_range definition has been overridden in the reptiles class to include time and temperature information (not explicitly shown on FIG. 5). This is another good design choice because it allows ZAF to treat reptile containment units differently than other containment units by allowing temperature adjustments to be made based on the time of day as well as on the current temperature of the containment unit itself.

Figure 6:
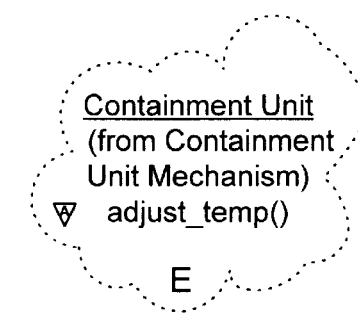

FIG. 6 is a class diagram showing a lower level view of the containment unit class. The containment unit class contains virtual operation definition adjust_temp( ). The adjust_temp definition defines both the interface and mechanism used to actually adjust the temperature in the containment units of the zoo (i.e., via heating and cooling mechanisms which are not shown).

How the ZAF Objects Interact

Beyond designing the objects that make up the solution to the specific problem, our framework designer must also design how the individual objects interrelate. In other words, the objects must interrelate in way that takes advantage of the manner in which they were designed. As discussed, the way in which the defined operations of an object operate on the data defined for the object is called the object's behavior. While objects may be characterized as autonomous entities, it is still very important that each object exhibit a consistent behavior when interrelating with other objects. Consistent behavior is important because objects depend upon the consistent behavior of other objects so that they themselves can exhibit consistent behavior. In fact, consistent behavior is so important that an object's behavior is often referred to as the contract the object has with the other objects. When an object does not exhibit a consistent behavior, it is said to have violated its contract with the other objects.

When an operation of one object needs access to the data controlled by a second object, it is considered to be a client of the second object. To access the data controlled by the second object, one of the operations of the client will call or invoke one of the operations of the second object to gain access to the data controlled by that object. One of the operations of the called object (i.e., a server operation in this case) is then executed to access and/or manipulate the data controlled by the called object.

Figure 7:
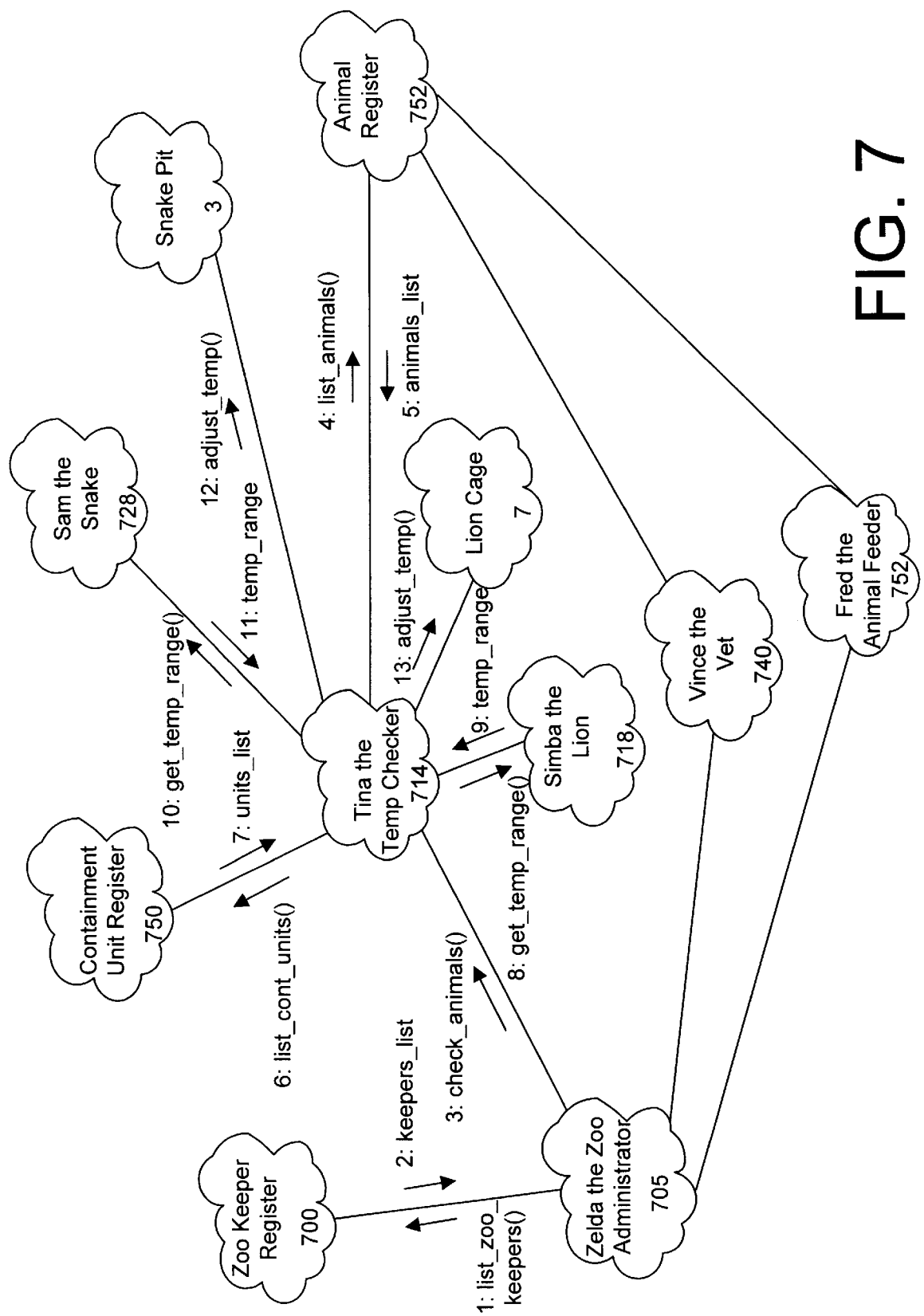
FIG. 7 is an object diagram for the example framework mechanism of FIGS. 1 through 6.

FIG. 7 is an object diagram showing how the example objects of ZAF interact to assist zoo personnel in operating the zoo. A detailed analysis of the interaction of all of the ZAF objects is unnecessary for the purposes of this overview. However, the reader should review the following simple control flow to obtain a rudimentary understanding of how objects interact to solve problems.

As mentioned, an object is created to be a member of a particular class. Therefore, Zelda the Zoo Administrator [object 706] is an object that is a member (actually the only member) of the zoo administrator class. As such, object Zelda is responsible for overall control of ZAF. All of the zoo keeper objects have registered with the Zoo Keeper Register object [object 700]. Therefore, object Zelda obtains a list of the current zoo keepers by calling the list_zoo_keepers( ) operation [step 1] of the Zoo Keeper Register object. The Zoo Keeper Register object has been created as a member of the zoo keeper register class. For the purposes of illustration, assume that this occurs every five minutes as part of Zelda's 5_minute_timer( ) operation. The Zoo Keeper Register object then responds with the zoo keepers list [step 2]. The list of zoo keepers includes Tina the Temperature Checker [object 714], Vince the Vet. [object 740], and Fred the Animal Feeder [object 752]. Each zoo keeper has been created as a member of the zoo keepers class. In particular, objects Tina the Temp. Checker, Vince the Vet., and Fred the Feeder are respectively members of the temperature controller, veterinarian, and feeder subclasses.

Once the list of current zoo keepers has been returned to object Zelda, object Zelda instructs each zoo keeper in the list to check the animals by calling the check_animals( ) operation of each zoo keeper object [only the call to Tina the Temp. Checker is shown—step 3]. Please note that object Zelda did not need to understand the types of zoo keepers that were in the zoo keeper list, the number of zoo keeper objects in the list, or the specialized characteristics of any one zoo keeper object. Object Zelda uses the same interface (i.e., the check_animals( ) operation) to communicate with each zoo keeper object. It is then up to the individual zoo keeper objects to perform the task for which they have been created. Each zoo keeper object performs its assigned task through use of its own check_animals( ) operation. For example, object Tina's check_animals( ) operation retrieves a list of current animals from the animal registry object by calling the list_animals( ) operation [step 4] and then a list of containment units from the containment unit register object by calling the list_cont_units( ) operation [step 6]. Upon examining the animal list, object Tina's check_animals( ) operation determines that there are only two animals currently registered in the zoo, Sam the Snake [object 728] and Simba the Lion [object 718].

Object Tina's check_animals( ) operation then calls the get_temp_range( ) operations to get temperature ranges from objects Sam and Simba [steps 8 and 10]. Once the temperature ranges have been returned, the check_animals( ) operation of object Tina determines which containment units house the respective animals (i.e., Simba and Sam) and then calls the adjust_temp( ) operation of the appropriate containment unit (i.e., Lion Cage 7 in the case of object Simba and Snake Pit 3 in the case of object Sam) to adjust the temperature of the containment units [steps 12 and 13].

The adjust_temp( ) operation of each containment unit then completes the control flow by proceeding to adjust the temperature in a way that is appropriate for the animals contained in each containment unit. (That is, the temperature is adjusted based on time and temperature for Snake Pit 3 and based on time alone for Lion Cage 7.) The reader should note that the relationship between the check_animals( ) operation and the adjust temp( ) operations is polymorphic. In other words, the check_animals( ) operation of object Tina does not require specialized knowledge about how each adjust_temp( ) operation performs its task. The check_animals( ) operation merely had to abide by the interface and call the adjust_temp( ) operations. After that, it is up to the individual adjust_temp( ) operations to carry our their tasks in the proper manner.

At this point, it is again worthwhile to point out that the ZAF mechanism is an extremely simplistic framework mechanism that has been presented here to help novice readers understand some basic framework concepts so as to best appreciate the benefits and advantages of the present invention. These benefits and advantages will become more clear upon reference to the following Detailed Description.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications*, 2nd ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171–228 of the aforementioned book. The notational system used herein will be explained generally below. Other notational conventions used herein will be explained as needed.

A system that is modeled by an object-oriented framework can be represented at a high level of abstraction by a diagram called a top-level class diagram. FIG. 1 of the drawings is an example of a top-level class diagram containing boxes that represent abstractions of the modeled system. The boxes are arranged in a hierarchy such that boxes representing abstractions close to the physical components of the system are at the lower levels of the diagram and boxes representing more abstract, functional components are closer to the top of the diagram. In FIG. 1, the boxes are labeled as "mechanisms" to denote that the abstractions comprise means for implementing modeled system components. The boxes (mechanisms) can be thought of as categories comprising groups of similar classes defined according to object-oriented programming concepts. FIG. 1 represents a zoo administration model and therefore the lower hierarchy boxes include a box called Animal Mechanism, which represents animals within the zoo model, and a box called Containment Unit Mechanism, which represents animal pens and cages. At the highest level of FIG. 1, the box called Zoo Administration represents a functional abstraction that encompasses a variety of administrative tasks that are performed by personnel.

The boxes in a top-level class diagram represent the system abstractions that provide the system behavior. The system abstractions include classes and objects. Details of the system classes are provided in a class diagram that is used to show the class categories and to indicate the relationships and responsibilities of the classes. A class is represented by an irregularly shaped, dashed-line icon commonly referred to a cloud. FIG. 2, for example, shows several classes represented as clouds. Each class is identified by a name that is unique to the associated class category and also indicates the relationship of each class to one of the mechanisms illustrated in FIG. 1. Within a class icon, the class name is listed above attribute names, operation names followed by parentheses, and constraints that are enclosed within brackets. FIG. 3 illustrates the class Zoo Administrator in greater detail. FIG. 3 indicates that the Zoo Administrator class includes multiple operations, including ones called "5_minute_timer( )", "add_animal( )", and "add_containment_unit( )". Words in the operation names (and class attribute names) are separated by an underscore for easier reading. An example of a class attribute listing is shown by the attributes called "feed_freq" and "temp_range" in the class Animals illustrated in FIG. 5.

Connecting lines between mechanisms (FIG. 1) and classes (FIG. 2) indicate the nature of the relationships between such respective abstractions. Thus, connections between the boxes in FIG. 1 represent relationships between the various mechanisms. A straight connecting line, for example, represents a simple association relationship indicating shared information. A "using" relationship is a refinement of a simple association whereby one abstraction that is referred to as a server or supplier provides services to another abstraction that is referred to as a client. Such a relationship is indicated by an open circle at one end of a simple association line, the open circle end designating the client that "uses" the associated server.

Another refinement of a simple association between two classes is a type referred to as an inheritance relationship. Inheritance is a relationship among classes in which one class shares the structure and/or behavior associated with one or more other classes. An inheritance association is also referred to as a "is a" relationship. Thus, given two classes A and B, the class A has an inheritance relationship with the class B if A is an example of a B; A is said to be a subclass of B and B is said to be a superclass or parent of A. That is, A "is a" B. An inheritance relationship is denoted with a connecting line that includes an arrowhead at one end to indicate a subclass that derives its characteristics from a parent class at the other end of the line.

Another refinement of class relationships is called an aggregation relationship, which denotes an association between a whole and its parts or attribute classes. In notation, an aggregation relationship is indicated between a whole class and an attribute class connected with an association line by a solid circle at the whole class end, with an attribute class at the other end.

Another relationship specified by a class diagram is an instantiation relationship. An instantiation relationship represents an instance of a class such as a particular implementation of a class as supported by a programming language. For example, a class called "animal" can have multiple instantiations comprising lions, tigers, and bears. An instantiation of a class is represented by a dashed association line with an arrowhead pointing from an instance of a class to the general class.

Finally, a class relationship referred to as a metaclass denotes a relationship in which a class itself is treated as an object that can be manipulated. That is, a metaclass is a class whose instances are themselves classes. Some computer languages, such as Small Talk, support the concept of a metaclass. Such relationships are denoted by a shaded line with an arrowhead pointing from an instance of a metaclass to the general metaclass.

Classes can be parameterized, which denotes a family of classes whose structure and behavior are defined independently of its formal class parameters. A parameterized class is represented by a cloud-shaped class icon with a rectangular box placed over a portion of the cloud. The parameter list is named within the rectangular box. An instantiated class includes a parameter box, called an adornment, in contrast to a dashed line box for a general class. The instantiation relationship between a parameterized class and its instantiated class is represented as a dashed line pointing to the parameterized class. Typically, an instantiated class requires a "using" relationship to another concrete class for use as an actual parameter.

Properties of classes can be represented by class adornments that are enclosed within the class cloud icon. In particular, an abstract class is denoted by an upper case block "A" within a triangle that is placed within a cloud. An abstract class is a class for which no instances may be created. That is, it is a class of classes. Other class adornments are functions of the OO implementation language. For example, the C++ language permits special class qualifications that will be given special adornments. A static class is represented by an upper case block "S" within an adornment triangle, a friend class is denoted by an upper case block "F" within an adornment triangle, and a virtual class is represented by an upper case block "V" within an adornment triangle.

In addition to defining classes, a designer of an object oriented programming system must define objects (see page 136 of Booch). Objects are represented as solid line clouds within which is placed the object name located above a list of object attributes. An object is a tangible entity that exhibits a well defined behavior. An object is intended to represent some part of a real system that is being represented by the object oriented program. An object is characterized by a state, a behavior, and an identity. An object can be thought of as an instance of a class. The behavior of an object is an indication of how the object acts and reacts in terms of its state changes and its message-passing actions.

Objects and their interrelationships are represented in object diagrams that comprise object icons having links that indicate synchronization between objects. Links are sequentially numbered to indicate the flow of operations. The existence of a link between two objects indicates an association between their corresponding classes and denotes a path of communication between them. Thus, a link between two objects indicates that one object may send messages to another. The direction of message transfer is indicated by adorning a simple connecting line with an arrowhead that points from an object that invokes an operation, referred to as the client, to the object that provides the operation, referred to as the supplier. Such a representation of a simple synchronization relationship denotes the simplest form of message-passing. Such an association can indicate, for example, the invocation of an operation. Operation parameters can be indicated adjacent the linking line.

Some objects may be active, meaning that they embody their own thread of control. That is, such objects are not simply sequential. Active objects may have a variety of concurrency characteristics. If an object has multiple threads of control, then synchronization must be specified. Message synchronization can be synchronous, meaning that the client will wait until the supplier accepts the message. Synchronous synchronization is indicated with an "X" with an arrowhead. Synchronization can encompass balking message-passing, meaning that the client will abandon the message if the supplier cannot immediately service the message. Balking is indicated with an arrowhead turned back on itself. Synchronization can encompass a time-out synchronization, meaning that the client will abandon the message if the supplier cannot service the message within a specified amount of time. Time-out synchronization is indicated with a clock face representation adjacent a linking arrowhead. Finally, synchronization can encompass an asynchronous message, meaning that the client sends an event to a supplier for processing, the supplier queues the message, and the client then proceeds without waiting for the supplier. Those skilled in the art will appreciate that asynchronous message synchronization is analogous to interrupt handling. Asynchronous message synchronization is indicated with a half arrowhead.

It bears mention that the Booch notation includes interaction diagrams that trace the execution of objects and classes. Interaction diagrams are essentially restructured object diagrams. That is, interaction diagrams convey the same information from that conveyed by object diagrams, but simply present the same information in a different format. The present specification makes use of object diagrams for the ZAF example and for the description of the invention, and those skilled in the art will recognize that interaction diagrams are equivalent and also will understand how to convert from one to the other without further explanation.

In FIG. 7, for example, the object called Zelda 706 obtains a list of current zoo keepers by calling an operation called List Zoo Keepers from the object called Zoo Keeper Register. The second processing step is represented in FIG. 7 by the Zoo Keeper Register object responding to the operation call by passing a message to the Zelda object that comprises the zoo keeper list. The zoo keeper objects include members of the Zoo Keepers class called Tina, Vince, and Fred. The third step indicated in the object diagram is for the object Zelda to pass a message to each of the zoo keepers instructing them to check the animals by calling the respective Check Animals operation of each zoo keeper object.

DETAILED DESCRIPTION

Figure 8:
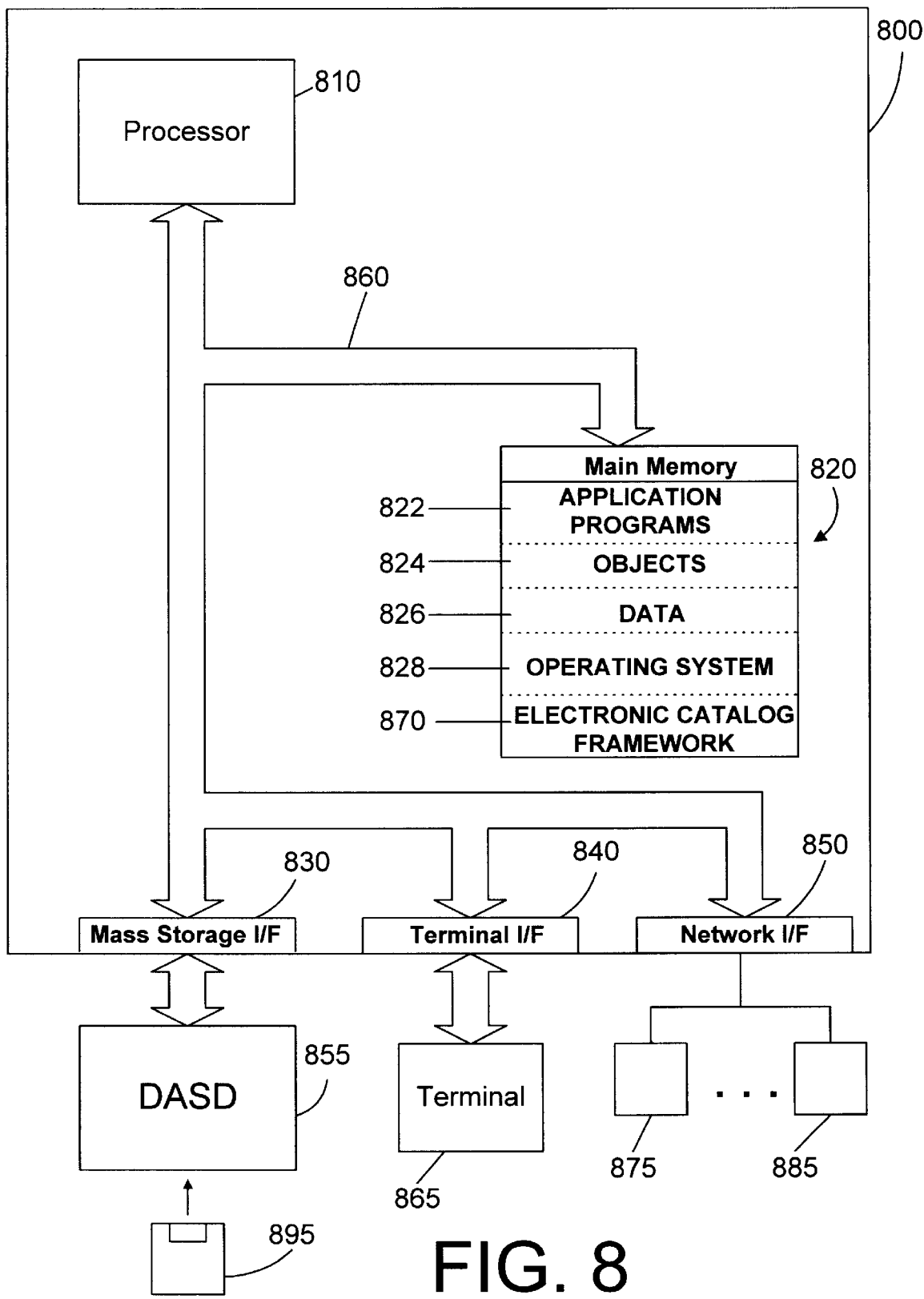
FIG. 8 is a block diagram of the computer system used in the preferred embodiment.

FIG. 8 shows a block diagram of a computer system 800 in accordance with the present invention. The computer system of the preferred embodiment is a computer system such as an AIX platform. However, those skilled in the art will appreciate that the mechanisms and apparatus of the present invention apply equally to any computer system, regardless of whether the computer system is a complicated multi-user computing apparatus or a single user workstation. As shown in the exploded view of FIG. 8, computer system 800 comprises main or central processing unit (CPU) 810 connected to main memory 820, mass storage interface 830, terminal interface 840, and network interface 850. These system components are interconnected through the use of a system bus 860. Mass storage interface 830 is used to connect mass storage devices (such as DASD device 855) to computer system 800. One specific type of DASD device is a floppy disk drive, which may store data to and read data from a floppy diskette 895.

Main memory 820 contains application programs 822, objects 824, data 826, and an operating system 828. Computer system 800 utilizes well known virtual addressing mechanisms that allow the programs of computer system 800 to behave as if they only have access to a large, single storage entity (referred to herein as "memory") instead of access to multiple, smaller storage entities such as main memory 820 and DASD device 855. Therefore, while application programs 822, objects 824, and operating system 828 are shown to reside in main memory 820, those skilled in the art will recognize that these programs are not necessarily all completely contained in main memory 820 at the same time. Note that the term "memory" is used herein to generically refer to the entire virtual memory of computer system 800.

Operating system 828 is a suitable multitasking operating system such as AIX; however, those skilled in the art will appreciate that the spirit and scope of the present invention is not limited to any one operating system. Operating system 828 preferably supports an object oriented programming environment such as that provided, for example, by the C++ programming language. One or more application programs 822 provide a programming environment for computer system 800, and include an electronic catalog framework mechanism 870, which is preferably an object oriented framework mechanism. Framework mechanism 870 contains instructions capable of being executed on CPU 810 and may exist anywhere in the virtual memory space of computer 800.

Although computer system 800 is shown to contain only a single main CPU and a single system bus, those skilled in the art will appreciate that the present invention may be practiced using a computer system that has multiple CPUs and/or multiple buses, whether contained in a single unit or distributed across a distributed processing computer system. In addition, the interfaces that are used in the preferred embodiment each include separate, fully programmed microprocessors that are used to off-load compute-intensive processing from CPU 810. However, those skilled in the art will appreciate that the present invention applies equally to computer systems that simply use I/O adapters to perform similar functions.

Terminal interface 840 is used to directly connect one or more terminals 865 to computer system 800. These terminals 865, which may be non-intelligent or fully programmable workstations, are used to allow system administrators and users to communicate with computer system 800.

Network interface 850 is used to connect other computer systems and/or workstations (e.g., 875 and 885 in FIG. 8) to computer system 800 in networked fashion. The present invention applies equally no matter how computer system 800 may be connected to other computer systems and/or workstations, regardless of whether the connection to the network is made using present-day analog and/or digital techniques or via some networking mechanism of the future. It is also important to point out that the presence of network interface 850 within computer system 800 means that computer system 800 may engage in cooperative processing with one or more other computer systems or workstations. Of course, this in turn means that the programs shown in main memory 820 need not necessarily all reside on computer system 800. For example, one or more application programs 822 may reside on another system and engage in cooperative processing with one or more programs that reside on computer system 800. This cooperative processing could be accomplished through use of one of the well known client-server mechanisms such as remote procedure call (RPC).

At this point, it is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media such as floppy disk (e.g., 895 of FIG. 8) and CD ROMs, and transmission type media such as digital and analog communication links.

Electronic Catalog Framework Mechanism of the Present Invention

The electronic catalog framework mechanism disclosed herein provides an architecture for providing different electronic catalogs. Extending the framework to accommodate a specific type of electronic catalog defines an "electronic catalog environment." For example, extending the framework to define a catalog for automotive parts for a particular parts company creates an electronic catalog environment that is tailored to the parts offered and the presentation, features, and functions desired by the company.

By providing framework mechanism 870 within computer system 800 to define electronic catalogs, a uniform interface for all electronic catalogs may be developed. Framework mechanism 870 may replace all of the proprietary and incompatible electronic catalog systems that are currently in use. This would allow a common programmer interface for defining virtually any type of electronic catalog, and a common user interface for interacting with an electronic catalog developed by extending framework 870. The common programmer interface greatly eases the burden of programming and maintaining an electronic catalog for the framework consumer. The common user interface allows the experience that a user acquires in dealing with other electronic catalogs developed using framework 870 to be useful in dealing with a new electronic catalog that is also developed using framework 870. Thus, some of the primary benefits of the framework disclosed herein is the capability to define new electronic catalogs with similar user interfaces using a simple, easy to use programmer interface defined by the framework. In addition, electronic catalog development tools may be implemented using framework 870.

Figure 9:
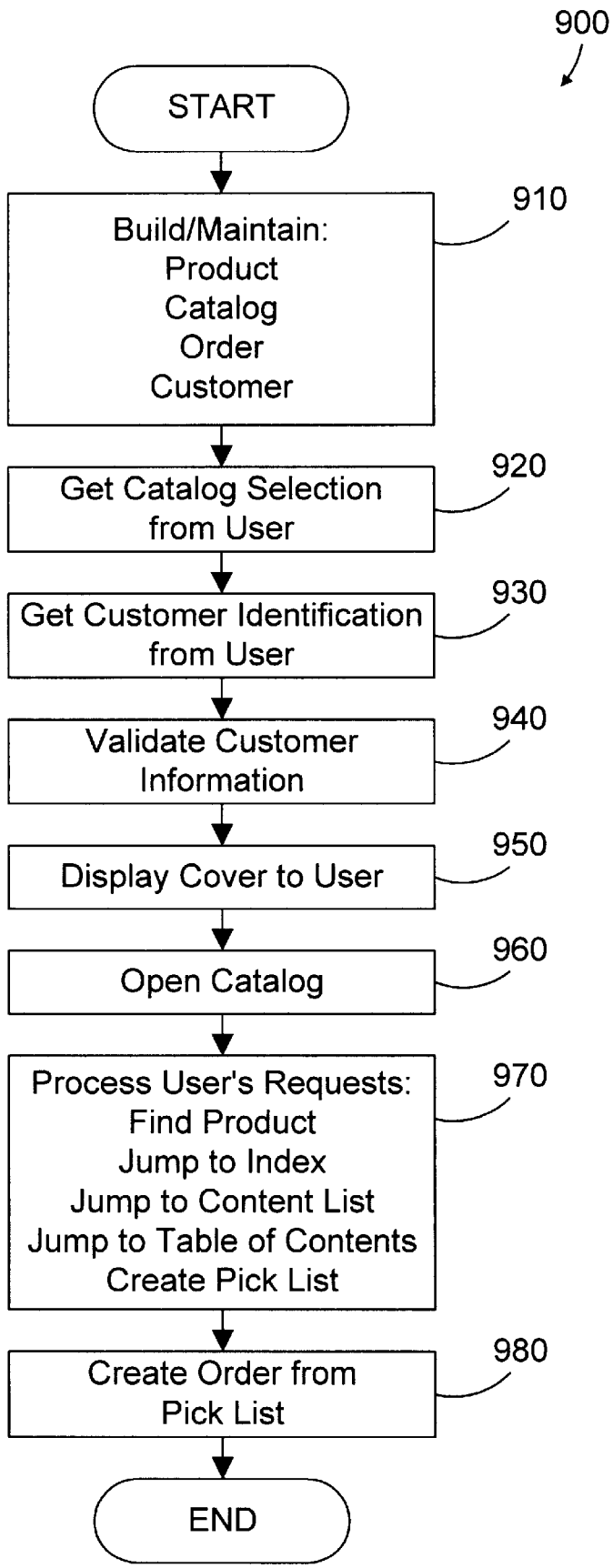
FIG. 9 is a flow diagram showing steps in accordance with the preferred embodiment to perform core functions of the framework mechanism.

Referring to FIG. 9, an example of electronic catalog framework 870 (FIG. 8) in accordance with the preferred embodiment performs steps that comprise a method 900 for defining an electronic catalog. The first step is to setup the components that are needed to define and use the desired electronic catalog (step 910). This step builds and maintains critical objects in the electronic catalog, such as product objects, the catalog object, order objects, and customer objects. Once one or more catalogs are defined and ready to use, a customer may interact with the electronic catalog to browse for product information and to place an order. To start using an electronic catalog, a user typically selects the desired catalog (step 920). For an on-line catalog, this selection may be made by the user clicking a link that identifies which catalog to use. Next, the customer may enter information that identifies the customer to the electronic catalog (step 930). This information may include a user password or authorization code if use of the catalog is restricted to authorized users. The electronic catalog then validates the customer information, if required (step 940). If the customer is authorized to access the electronic catalog, the catalog cover is then displayed to the user (step 950). The cover page may include advertisements for special sales items, or any other appropriate information that needs to be conveyed to a user. The cover page will typically include a link that will open the catalog (step 960) when selected by a user. Once the catalog has been opened, the catalog may process any user request that is supported by the catalog (step 970). Examples of some suitable user requests are: finding a product; jumping to a catalog index; jumping to a listing of the contents of the catalog; jumping to a table of contents; and creating a pick list. Once the pick list is complete, the user may submit the pick list to create an order (step 980).

Note that a particular electronic catalog may not else some of the steps in method 900, or may use steps in a different order than shown in FIG. 9. These individual steps are defined by the framework, and allow a framework consumer to pick and choose the specific steps and their order needed to provide a particular electronic catalog.

The fact that the preferred embodiment of the framework is object oriented allows the framework consumer to easily define the needed functions by subclassing from the classes defined within the framework using known object oriented programming environments, such as C++. The preferred embodiment of the present invention is an object oriented electronic catalog framework. While many different designs and implementations are possible, one suitable example of an object oriented electronic catalog framework is disclosed below to illustrate the broad concepts of the present invention.

Class Definitions

Figure 10:
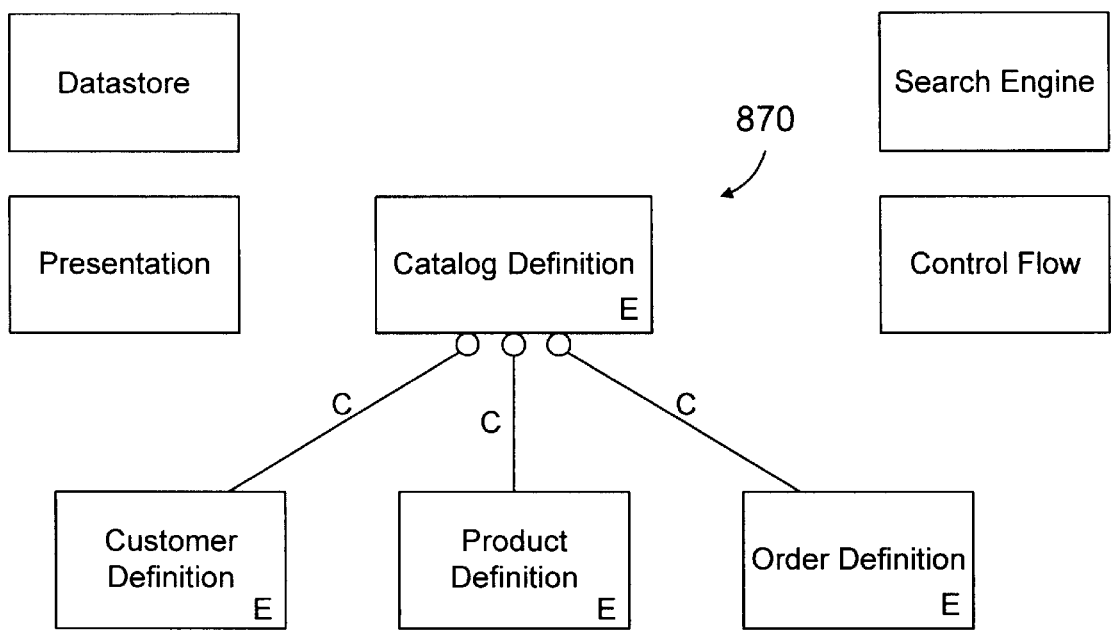
FIG. 10 is a category diagram of a framework mechanism constructed in accordance with the teachings of the preferred embodiment.

FIG. 10 is a category diagram of the electronic catalog framework mechanism 870 in accordance with the preferred embodiment. The categories in the framework 870 include: Catalog Definition, Customer Definition, Order Definition, and Product Definition. These categories each represent a collection of object oriented programming (OOP) classes that encapsulate data attributes and behaviors (or methods). Objects instantiated as members of these classes are stored in the main memory 820 of computer system 800. These classes may be implemented, for example, in a computer system operating environment that supports the C++ programming language. Also shown are categories Datastore, Presentation, Search Engine, and Control Flow, which are not defined by framework mechanism 870 but which interact with classes in framework mechanism 870.

The Datastore category defines a non-volatile storage mechanism for storing the components of the electronic catalog framework 870. Datastore represents any suitable type of storage mechanism without regard to the specifics of its implementation. The Presentation category defines how information is displayed to a user. Many different implementations are possible depending on the desired user interface. The Search Engine category defines a search engine for locating items in a catalog. The Control Flow category defines the sequence on interacting with the components of framework mechanism 870. Restricting framework mechanism 870 to the catalog definition without forcing the implementation of classes represented by the Datastore, Presentation, Search Engine, and Control Flow categories results in an extremely flexible system that allows a catalog designer to easily implement practically any type of catalog in any desired fashion by appropriate subclassing of the framework anti by defining classes in the Datastore, Presentation, Search Engine, and Control Flow categories.

Referring again to FIG. 10, the categories of framework mechanism 870 are extensible categories (as indicated by the "E" label), meaning that a framework consumer may extend some of the classes in these categories by defining and implementing classes that are subclasses of framework-defined classes. The Catalog Definition category has a using relationship with the Customer Definition category, the Order Definition category, and the Product Definition category, indicating that classes within the Catalog Definition category invoke the methods provided by the classes in these categories. Note that these relationships between categories are core relationships (as indicated by the "C" label), meaning that neither the framework consumer nor user can modify these relationships.

Figure 11:
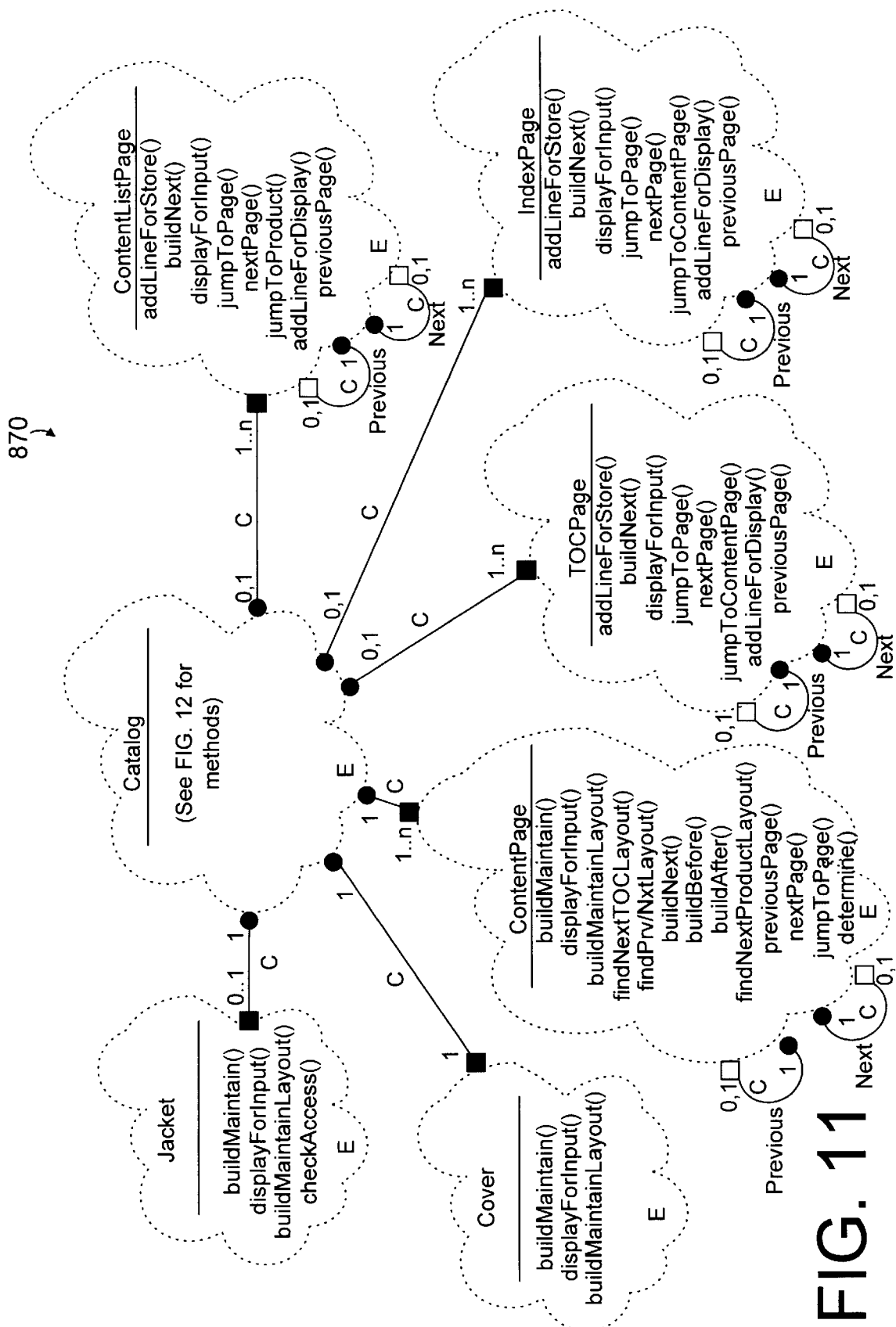
FIGS. 11–22 are class diagrams of a framework mechanism constructed in accordance with the teachings of the preferred embodiment.

FIGS. 11–22 illustrate class diagrams of the classes used to implement electronic catalog framework 870. Referring now to FIG. 11, the classes that belong to the Catalog Definition category are all extensible, and include: Catalog, Jacket, Cover, ContentPage, TOCPage, IndexPage, and ContentListPage. The Catalog class has a "contains by value" relationship with each of the other classes, with the numbers on the relationships between the classes indicating the number of corresponding objects that may be instantiated under each class. For each Catalog object, there is either no Jacket or one Jacket; there is one Cover; there is one or more ContentPage; there is zero or more TOCPage; there is zero or more IndexPage; and there is zero or more ContentListPage. Each of the ContentPage, TOCPage, IndexPage, and ContentListPage classes have a "contains by reference" relationships to themselves to provide linking between pages to allow a user to move from one page to a previous or next page.

Jacket is an extensible class that allows a catalog to request user authentication before allowing access to the catalog. User authentication in this context means any type of information that the catalog may want to collect from the user. For example, if the catalog needs to be restricted to a defined set of authorized users, the user may be required to enter a user name and password before access is granted. For example, a jacket may be presented for a catalog for a 'shopping club' store where a membership fee is required to shop in the store. The catalog developer may, or may not charge the customer a membership fee, but the control is maintained on who accesses the catalog. The jacket may also collect other information besides user authentication information. For example, the catalog may require a user to complete a survey for the purpose of determining where the user heard about the catalog, what items they are looking for, etc. Jacket is a class that allows a consumer of the framework mechanism to define information that is required before allowing access to the catalog. Of course, if the catalog is open to anyone without requiring any input of information from the user, no objects will be instantiated under the Jacket class.

The Jacket class defines a buildMaintain( ) method, a displayForInput( ) method, a buildMaintainLayout( ) method, and a checkAccess( ) method. BuildMaintain( ) is invoked when the Jacket needs to be initially created and when the Jacket needs to be modified (i.e., maintained). The displayForInput( ) method is invoked to display the Jacket to the user in order for the user to enter the requested information. The buildMaintainLayout( ) method is used to layout the Jacket after it is created or to change the layout of the information on the jacket. CheckAccess( ) is called to enforce password and other access restrictions.

The Cover class is an extensible class that defines an introductory page, similar to the cover of a catalog in print form, that may include any suitable information that needs to be conveyed to a user. The introductory page may include such information as sales items, financing terms, etc. Cover defines three of the same methods as Jacket that perform the same functions described with respect to the Jacket class on the Cover class.

ContentPage is an extensible class that defines a regular catalog page that typically contains product information. ContentPage defines methods buildMaintain( ), displayForInput( ), and buildMaintainLayout( ), which perform similar functions as these methods described above with respect to the Jacket class. The findNextTOCLayout( ) method retrieves the next layout portion of the table of contents. The findPrv/NxtLayout( ) method is used to retrieve the next layout portion of the content page. The buildNext( ) method is invoked to construct the next content page. The buildBefore( ) method creates a content page before the current content page. The buildAfter( ) method creates a content page after the current content page. The findNextProductLayout( ) method returns the next product layout on the current content page. The previousPage( ) and nextPage( ) methods are invoked to go to the previous and next content pages, respectively.

The TOCPage class defines a table of contents pages for an electronic catalog. Many of the methods on the TOCPage class are similar to the methods discussed above. The addLineForStore( ) and addLineForDisplay( ) methods are used to add a line in the stored table of contents and to add a line to the displayed table of contents, respectively. In addition, the jumpToPage( ) and jumpToContentPage( ) methods allow a user to navigate between the table of contents and other pages.

The IndexPage class defines an index page for an electronic catalog. The methods defined by IndexPage have been discussed above with respect to other classes, and perform similar functions on the IndexPage class. The ContentListPage class defines a list of contents in the catalog, with similar methods to those already discussed above.

An electronic catalog environment requires a framework consumer to extend several classes that collectively define an electronic catalog environment. Generally, an electronic catalog environment is created by creating or specifying subclasses that collectively define a catalog, one or more customers, one or more products, and one or more orders. Note that all of the relationships between classes in FIG. 11 are core relationships, which neither a consumer nor a user of the framework may alter. As such, they are part of the core function of framework 870.

Figure 12:
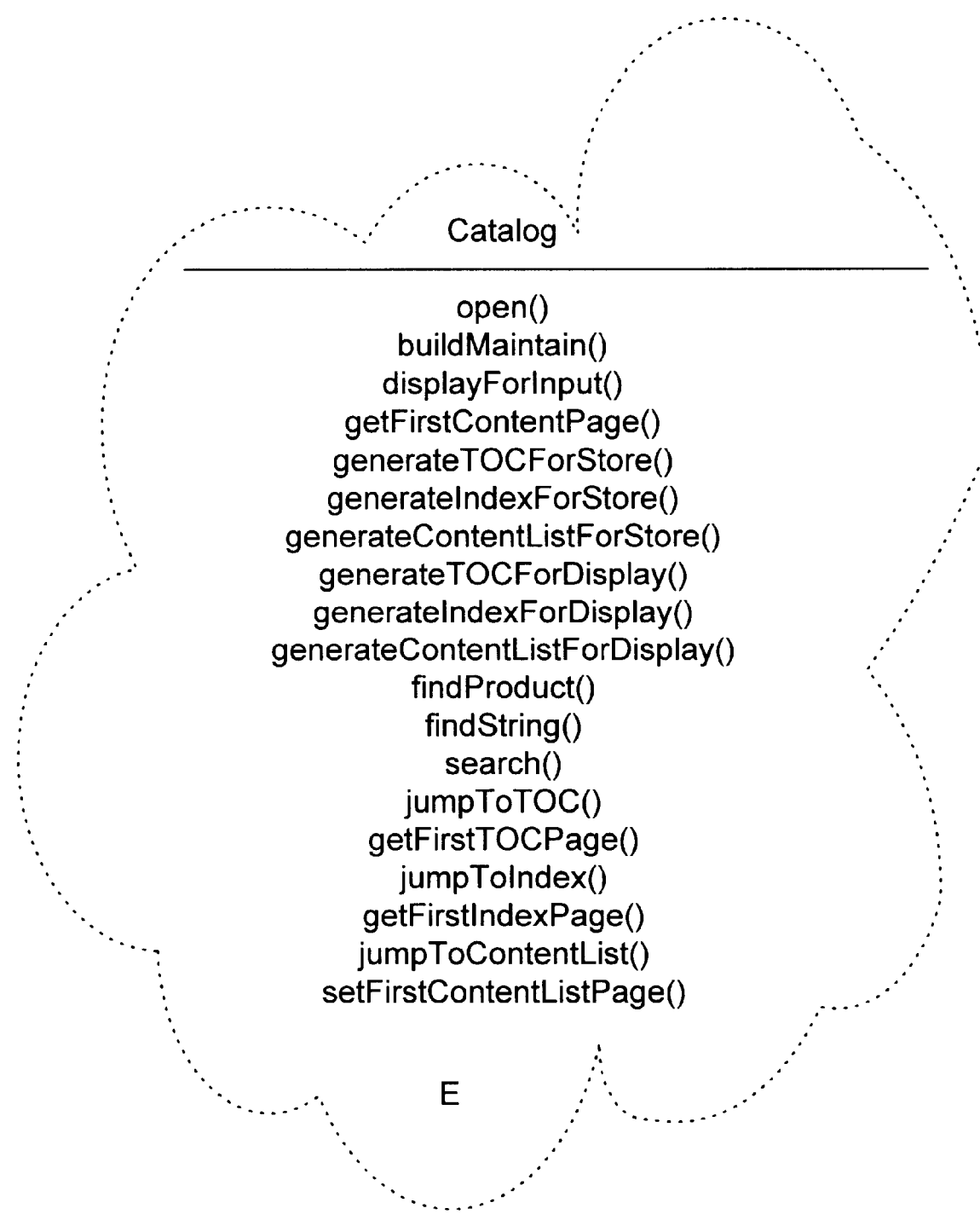

Referring now to FIG. 12, the Catalog class of FIG. 11 includes many methods. The buildMaintain( ) method is invoked to initially create and subsequently maintain the catalog. The displayForInput( ) method displays the catalog to the user. The getFirstContentPage( ) method retrieves the first content page. The methods generateTOCForStore( ), generateIndexForStore( ), and generateContentListForStore( ) each generate respective table of contents, index, and content list in a format that may be stored for later use. When these items are stored for later use, when a request is made to display a page, the information is retrieved from storage. The methods generateTOCForDisplay( ), generateIndexForDisplay( ), and generateContentListForDisplay( ) each generate respective table of contents, index, and content list as they are needed. These methods may initially generate these items once in a format that may be displayed to a user, and subsequent calls to these methods would then display the previously generated item. In the alternative, these methods may dynamically generate these items when they are needed.

The findProduct( ) method allows a user to specify a search criteria for finding a product in the catalog. The findString( ) method has a broader application, looking for a search term anywhere in the catalog, rather than just searching for products. The search( ) method formats search criteria into a format that is understood by an external search engine, calls the external search engine, and formats the results from the search into a search hit list. ThejumpToTOCPage( ) method allows a user to jump from the current page to the indicated table of contents page. The getFirstTOCPage( ) retrieves the first page from the table of contents. The jumpToIndex( ) method allows a user to jump to the indicated index page. The getFirstIndexPage( ) method retrieves the first page from the index. The jumpToContentList( ) method allows a user lo jump from the current page to the content list for the indicated page. And the setFirstContentListPage( ) method establishes which content list page is the first of the group.

Figure 13:
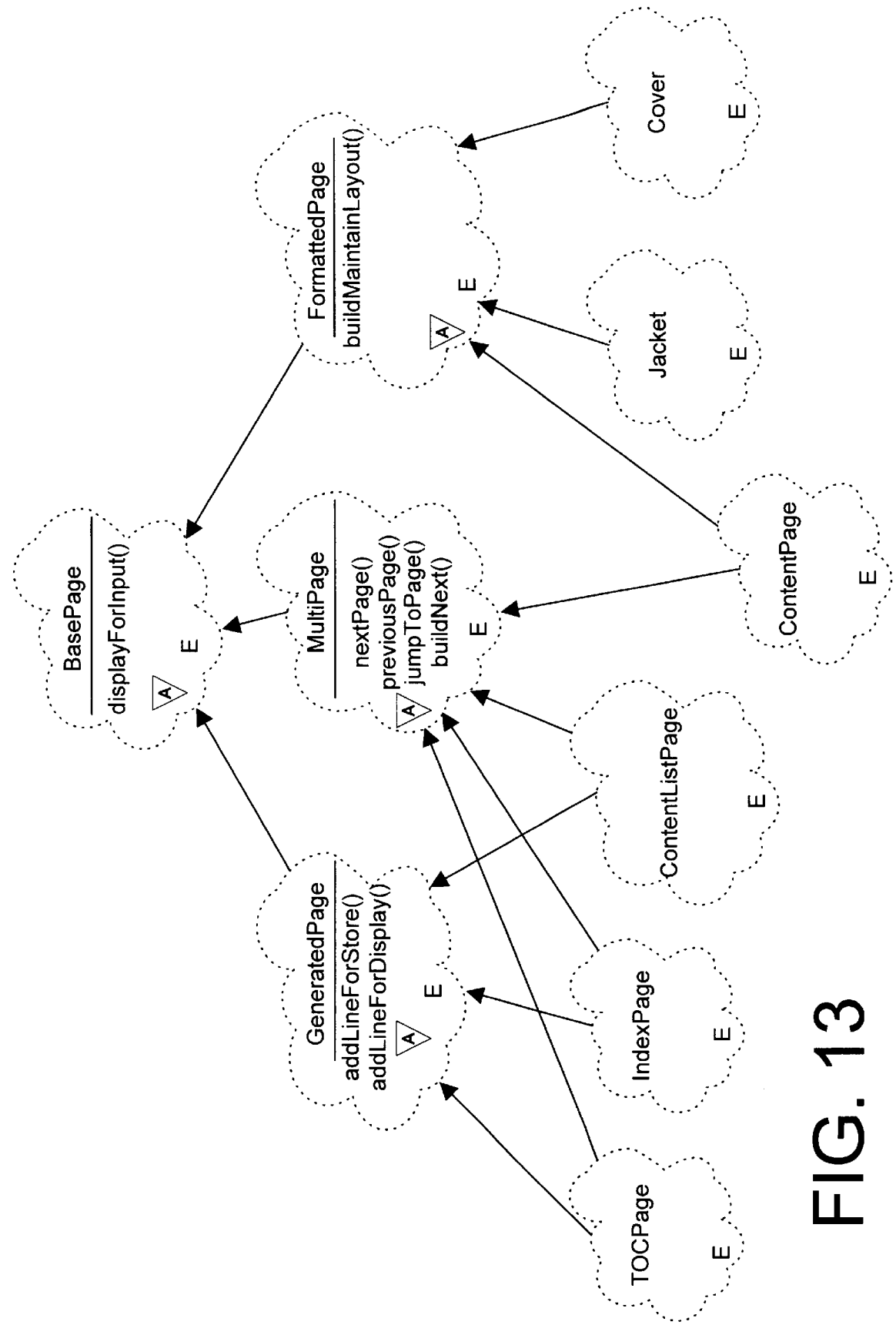

FIG. 13 illustrates how many of the classes of FIG. 11 may be defined through subclassing from abstract classes that have the desired attributes. A base class BasePage is an abstract extensible class that defines a method displayForInput( ), which is a method that displays something to the user and awaits input from the user. The abstract extensible classes GeneratedPage, MultiPage, and FormattedPage are all subclassed from the BasePage class, thereby inheriting a default definition for method displayForInput( ). In addition, GeneratedPage defines an addLineForStore( ) method and an addLineForDisplay( ) method that adds a line that may be stored or displayed to the user. MultiPage defines methods nextPage( ), previousPage( ), jumpToPage( ), and buildNext( ). The FormattedPage class defines a method buildMaintainLayout( ). All of the classes contained in the Catalog class of FIG. 11 are defined by subclassing from the GeneratedPage class, the MultiPage class, and the FormattedPage class, as shown in FIG. 13.

The classes TOCPage, IndexPage, and ContentListPage each have multiple inheritance from GeneratedPage and MultiPage, thereby defining default methods for the methods in each of these two parent classes. The ContentPage class has multiple inheritance from the MultiPage class and the FormattedPage class, thereby defining default methods for the methods in each of these two parent classes. Jacket and Cover are both subclasses of the FormattedPage class. By defining the various classes of FIG. 11 that are contained by the Catalog class as concrete subclasses of abstract classes, many of the needed methods may be inherited from the parent abstract classes rather than having to code these methods for each concrete class. The default methods defined by the parent classes may be overridden if necessary to provide the specific function needed for a particular class.

Figure 14:
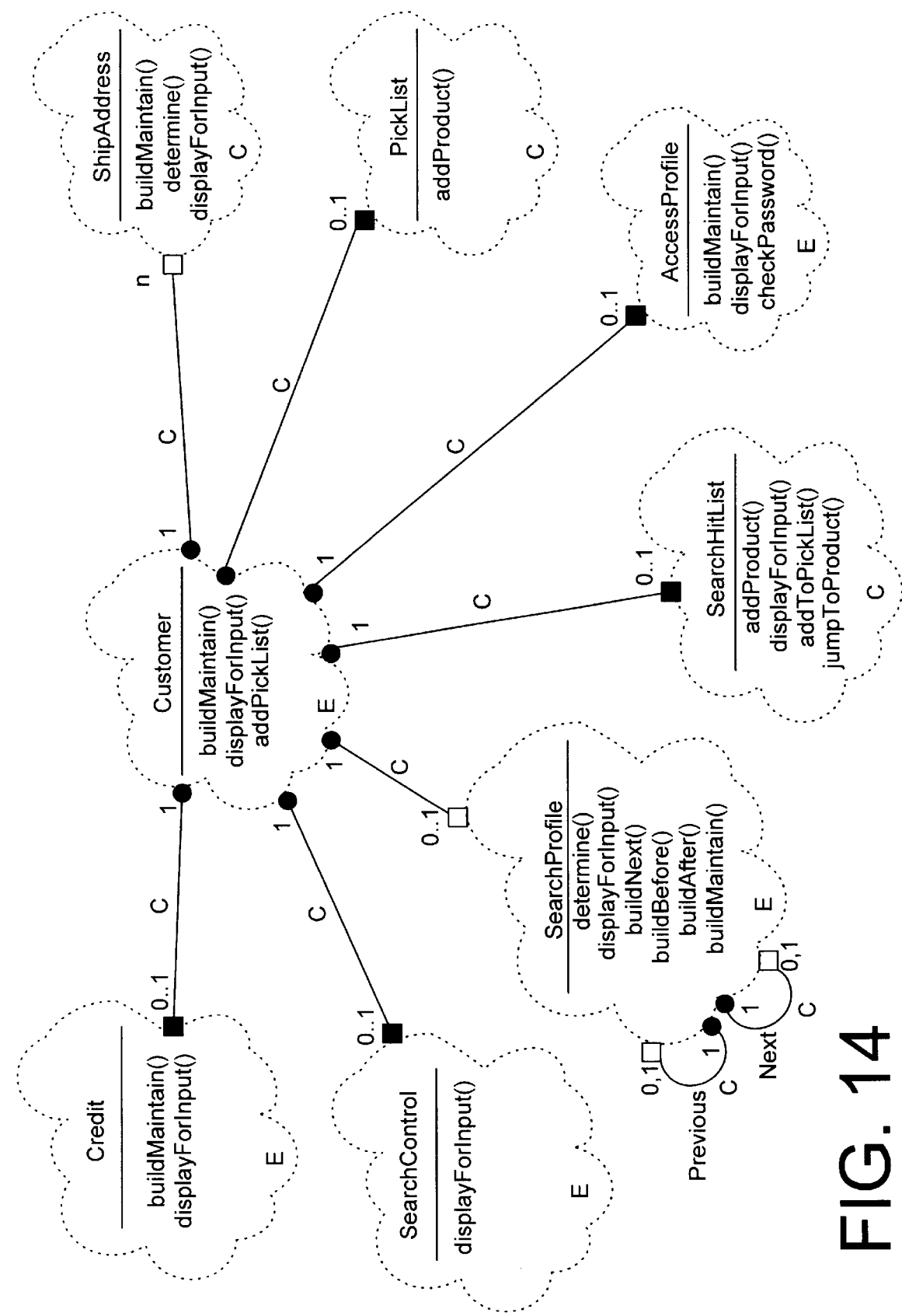

Referring to FIG. 14, the classes that belong to the Customer Definition category include: Customer, Credit, SearchControl, SearchProfile, SearchHitList, AccessProfile, PickList, and ShipAddress. The SearchHitList class and PickList class are core classes of the framework, while the remaining classes are extensible. The Customer class has a "contains by value" relationship with the credit class, the SearchControl class, the SearchHitList class, the AccessProfile class, and the PickList class, and has a "contains by reference" relationship with the SearchProfile class and the ShipAddress class. In addition, the SearchProfile class has a "contains by reference" relationship with itself to support moving to the previous or next search profile.

The Customer class represents a customer that is shopping for products using the catalog. Each customer may contain objects from the (Credit, SearchControl, SearchProfile, SearchHitList, AccessProfile, PickList, and will contain one or more objects from ShipAddress. The Credit class represents the financial information pertaining to the customer. SearchControl is search criteria formatted as needed for a particular external search engine. Note that framework 870 does not define a particular search engine, but instead adds a level of abstraction, allowing a framework consumer to use or develop any search engine that is defined external to framework 870.

The SearchProfile class defines search profiles for the customer. These search profiles are preferably previous searches that are saved in a list by the customer for future use. SearchProfile defines a method determine( ) that provides a list of all instances of the class (i.e., objects that are members of the class) to the user, and allows the user to select one of the instances from the list as the desired instance. The method displayForInput( ) displays the search profile information to the user. The buildNext( ) method is used to allow a user to define a new search profile. The buildBefore( ) method is used to store a search profile as the search profile preceding the current search profile in the list. Similarly, the buildAfter( ) method is used to store a new search profile as the search profile following the current search profile in the list. The buildMaintain( ) method is used to create and maintain objects instantiated as members of the SearchProfile class.

The SearchHitList class defines objects that provide a list of search results. SearchHitList defines a method addProduct( ) that adds a product to the search hit list, a method addToPickList( ) that adds a product to the current pick list, and a method jumpToProduct( ) that allows a user to jump to a product on the search hit list. The AccessProfile class provides information relating to the access profile of the customer. For example, in the case of juvenile customers, an AccessProfile object may indicate that the customer is a juvenile, which might be used, for example, to prevent the juvenile from accessing adult products. In addition, an AccessProfile object may include password information that the user must enter before accessing the catalog or portions of the catalog.

The PickList class represents a pick list or shopping list that a user may assemble before submitting an order. The pick list is a temporary list of items that may be reviewed and edited by the user until only the items that the user wants to order are on the pick list, at which time an order may be created from the pick list. PickList defines a method addProduct( ) that is invoked to add a product to the current pick list. The ShipAddress class defines one or more shipping address for each customer.

Figure 15:
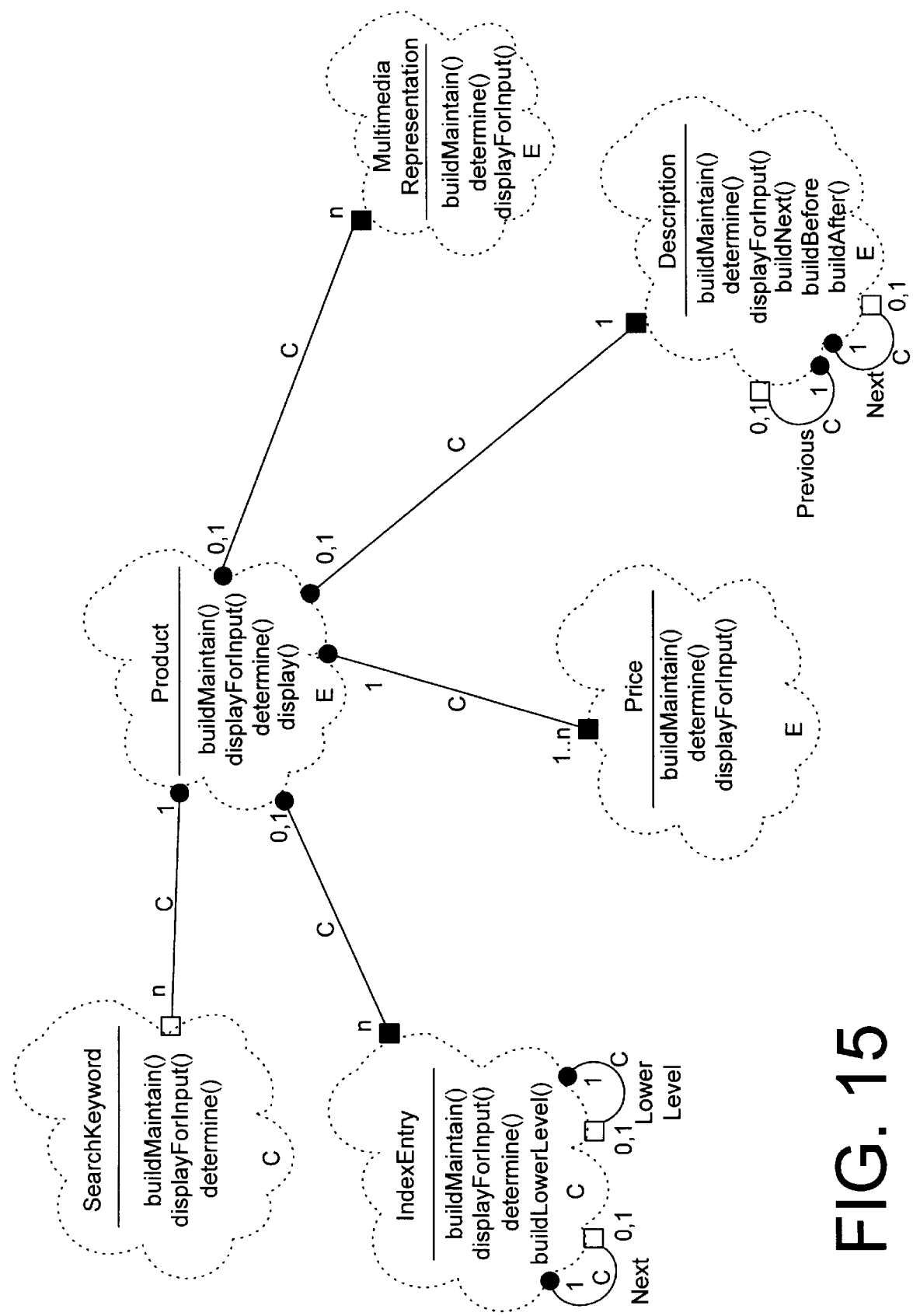

Referring now to FIG. 15, the classes that belong to the Product Definition category include: Product, SearchKeyword, IndexEntry, Price, Description, and MultimediaRepresentation. The Product class is an extensible class that has a "contains by reference" relationship with the SearchKeyword class, and has a "contains by value" relationship with the remaining classes. Each Product object will have one or more SearchKeyword objects, zero or more IndexEntry objects, one or more Price objects, one Description object, and zero or more MultimediaRepresentation objects.

SearchKeyword is a core class of the framework 870 that represents one or more keywords that will identify the associated product if that keyword is searched. IndexEntry is a core class of the framework that identifies the product in the index, and includes a "contains by reference" relationship with itself, allowing an IndexEntry object to go to the next IndexEntry object. IndexEntry also has a second "contains by reference" relationship with itself, allowing an IndexEntry object to go to a lower level index entry, thereby allowing a catalog designer to design multiple-level indices.

Price is an extensible class that represents the price for the product. Description is an extensible class that represents a text description for the product. And MultimediaRepresentation is an extensible class that represents any type of suitable representation of the product, including audio, video, etc. The MultimediaRepresentation class allows an electronic catalog to provide multimedia samples of the products they sell. For example, a catalog that sells popular music on compact discs may provide audio clips of some of the songs. A catalog for selling furniture could include a video tour of a dining room set, emphasizing the workmanship, special features, etc.

Figure 16:
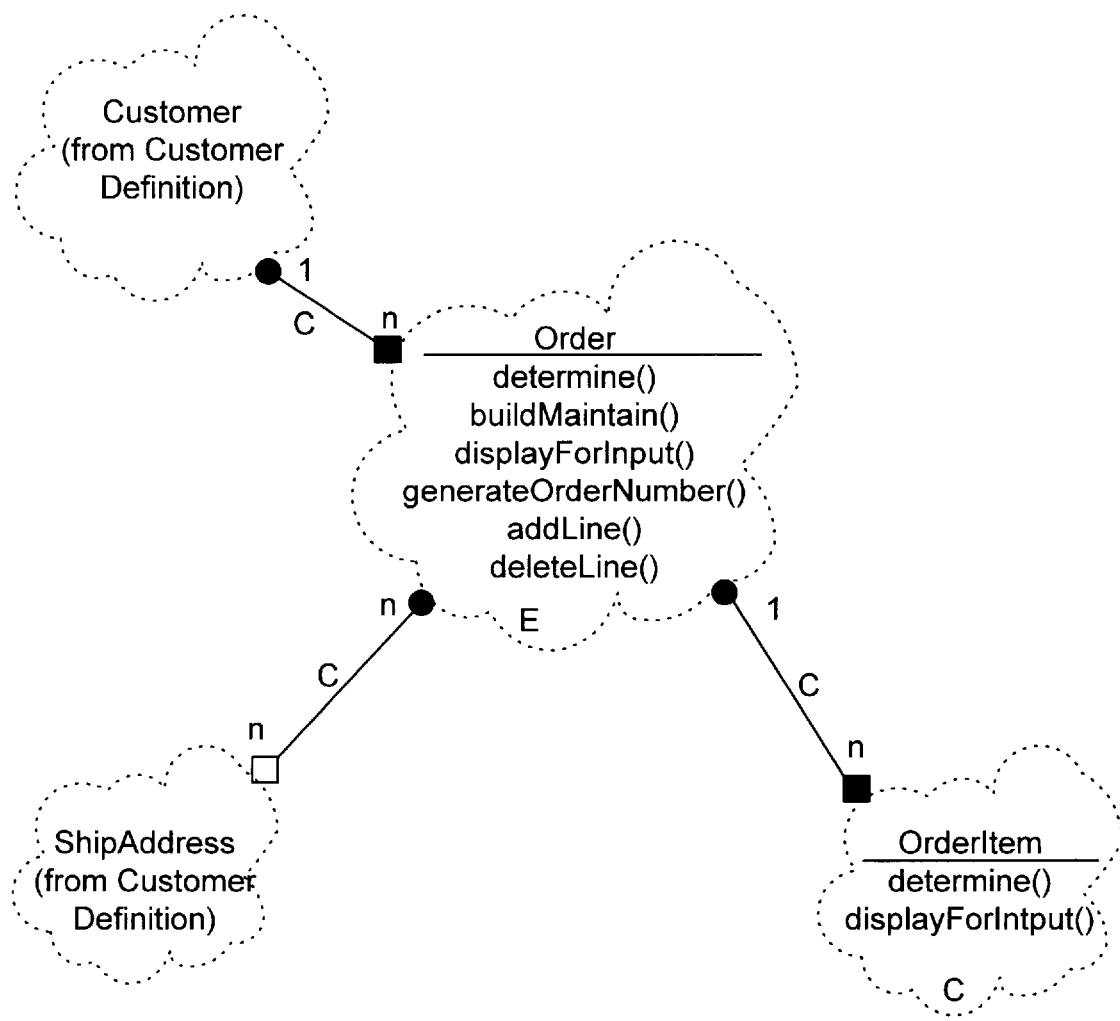

Referring to FIG. 16, the classes that belong to the Order Definition category include Order and OrderItem. Also shown in FIG. 16 are the Customer and ShipAddress classes from the Customer Definition category. The Order class has a "contains by reference" relationship with the ShipAddress class, and has a "contains by value" relationship with the OrderItem class. Customer has a "contains by value" relationship with the Order class. In other words, each customer may have one or more orders, and each order may have multiple ship addresses and multiple order items.

Order is an extensible class that defines an order for a customer. OrderItem is a core class and defines an item that may be ordered from the catalog. The Order class includes a buildMaintain( ) method that creates and maintains an order object. The displayForInput( ) method displays the order to a user. The generateOrderNumber( ) method creates an order number for a new order. The addLine( ) method adds one line in the order, while the deleteLine( ) method deletes one line from the order.

OrderItem corresponds to an entry on an order form, and does not necessarily have a one-to-one correlation with products. One order item, for example, could be a single part number that specifies a kit of multiple products. OrderItem includes a method determine( ) that allows a user to select one particular order item from a list of all order items (i.e., objects that are members of the OrderItem class), and also includes a method displayForInput( ) that displays the OrderItem to the user.

Figure 17:
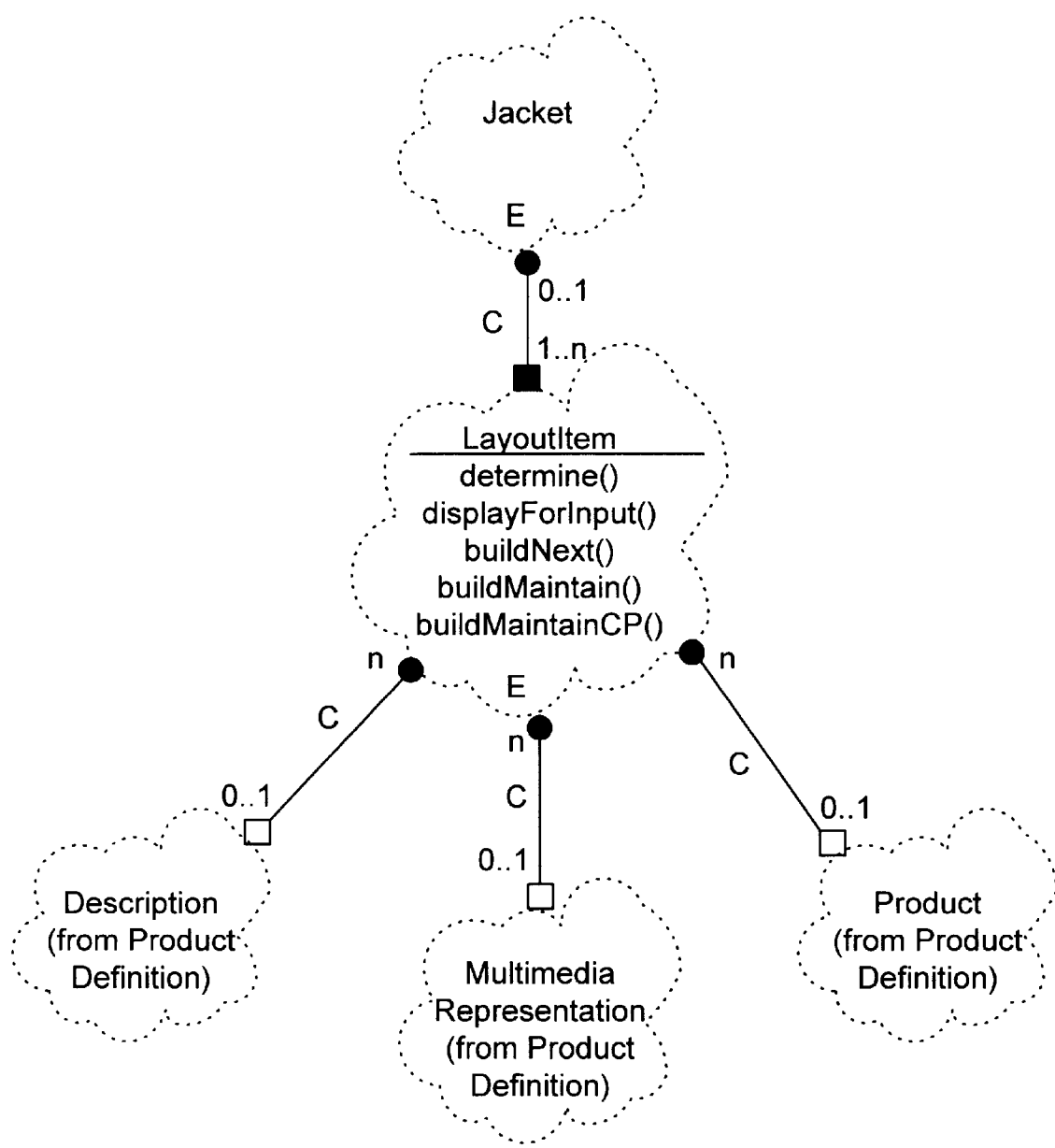

FIGS. 17–22 have class diagrams that disclose further details of some of the classes in FIG. 11. Referring to FIG. 17, a LayoutItem class is a member of the Catalog Definition category, and has a "contains by reference" relationship with the Description class, the MultimediaRepresentation class, and the Product class from the Product Definition category. Each Jacket will have one or more layout items, and each layout item may have a description, a multimedia representation, or a product. LayoutItem includes a determine( ) method that displays a list of LayoutItem objects to the framework consumer and allows the framework consumer to select one as the desired LayoutItem. The displayForInput( ) method displays the LayoutItem to the framework consumer. The buildNext( ) method is invoked to construct the next layout item. The buildMaintain( ) method is used to construct and subsequently maintain a LayoutItem object. And the buildMaintainCP( ) method is invoked to define TOC headings as part of the layout of a content page.

Figure 18:
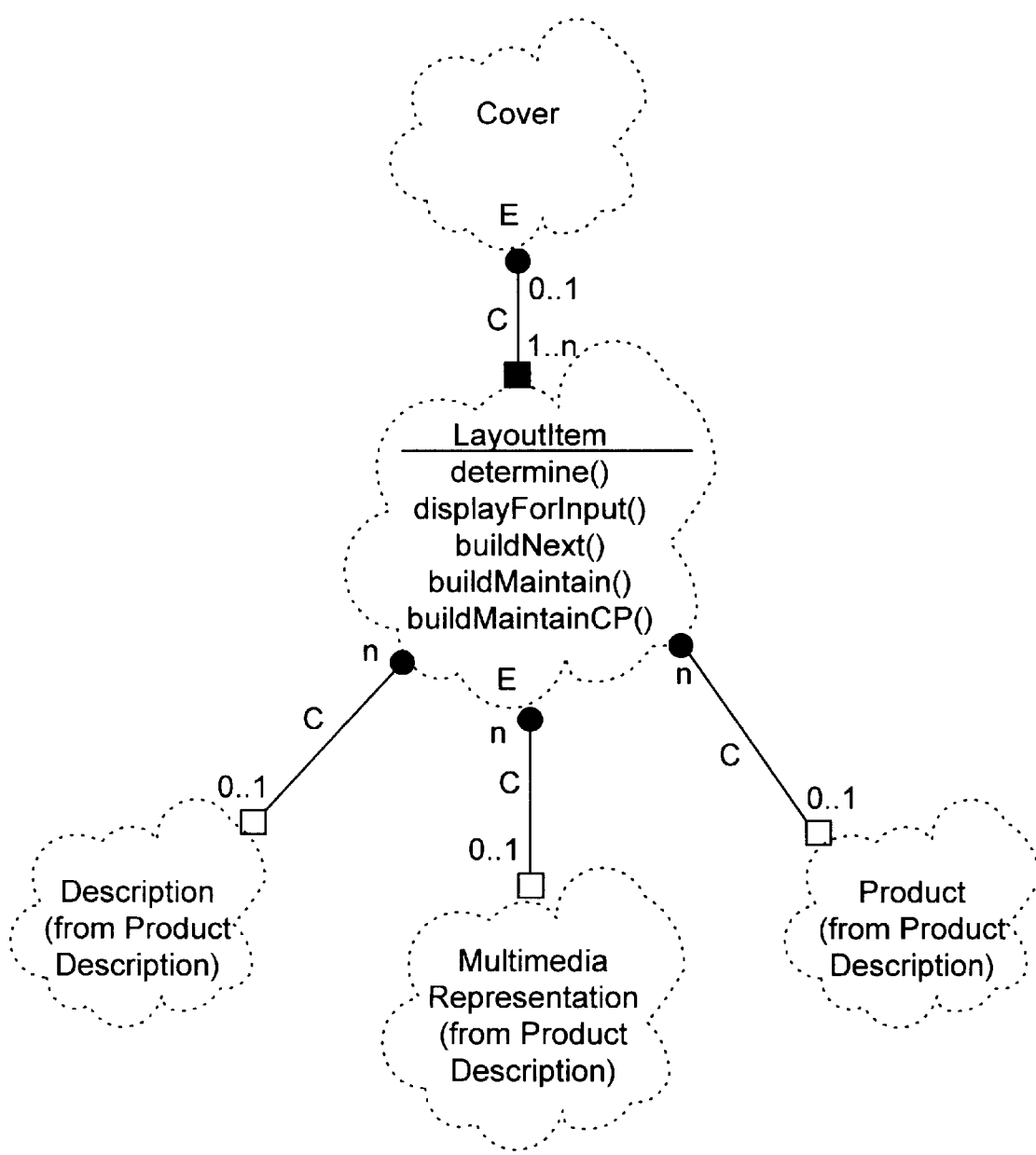

FIG. 18 is a class diagram showing the relationship of the LayoutItem class of FIG. 17 to the Cover class of FIG. 11. The Cover class has a "contains by value" relationship with the LayoutItem class, which has a "contains by reference" relationship with each of the Description, MultimediaRepresentation, and Product classes. Each cover may contain one or more layout items. The methods for LayoutItem( ) in FIG. 18 are the same as those described in conjunction with FIG. 17.

Figure 19:
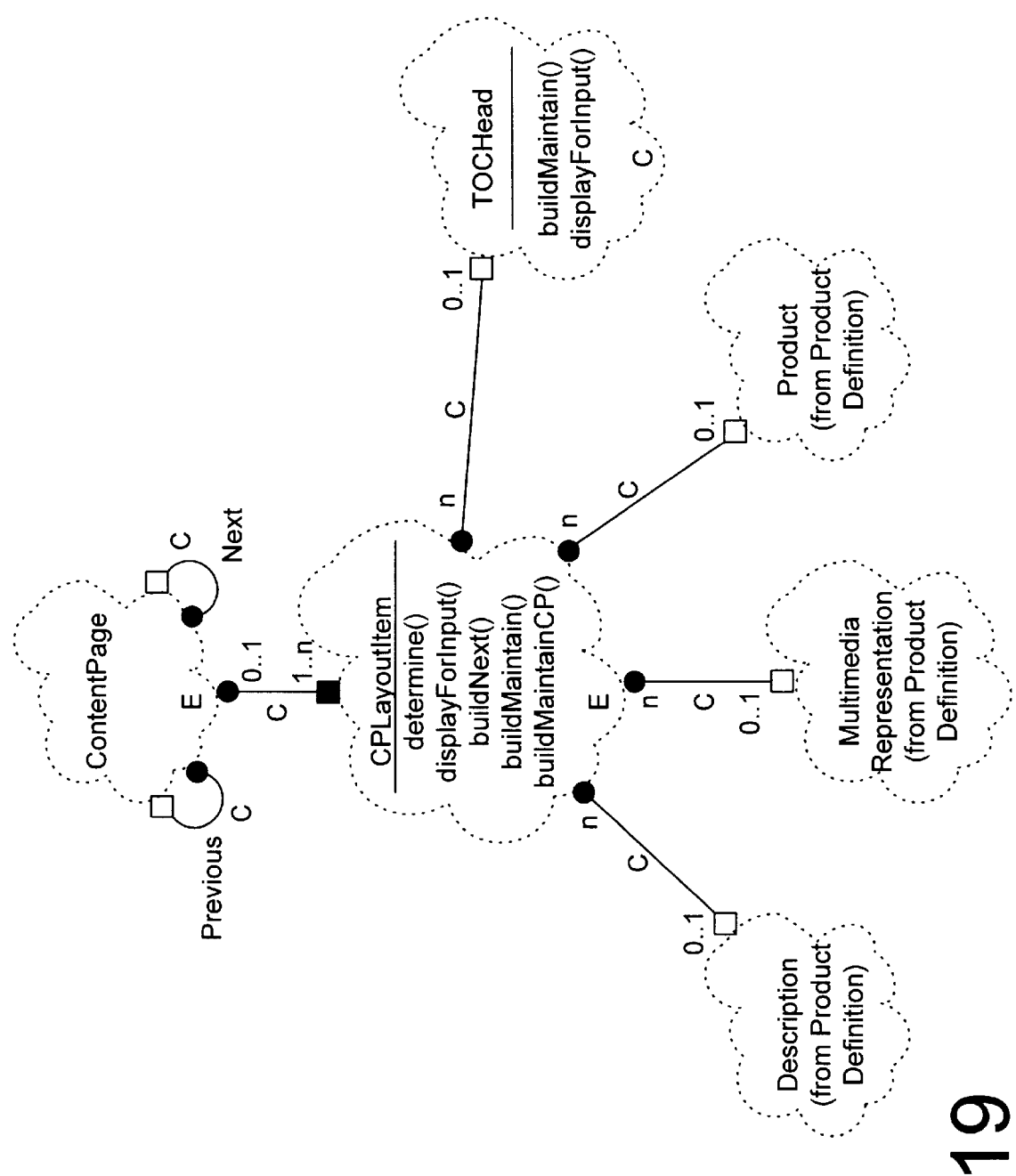

FIG. 19 represents that the ContentPage class of FIG. 11 has a "contains by value" relationship with the CPLayoutItem class, which has a "contains by reference" relationship with each of the Description, MultimediaRepresentation, Product, and TOCHead classes. In other words, each ContentPage object will have one or more content page layout items, which may each have a description, a multimedia representation, a product, and/or a table of contents header. ContentPage, LayoutItem, and TOCHead all belong to the Catalog Definition category, while Description, MultimediaRepresentation, and Product belong to the Product Definition category.

Figure 22:
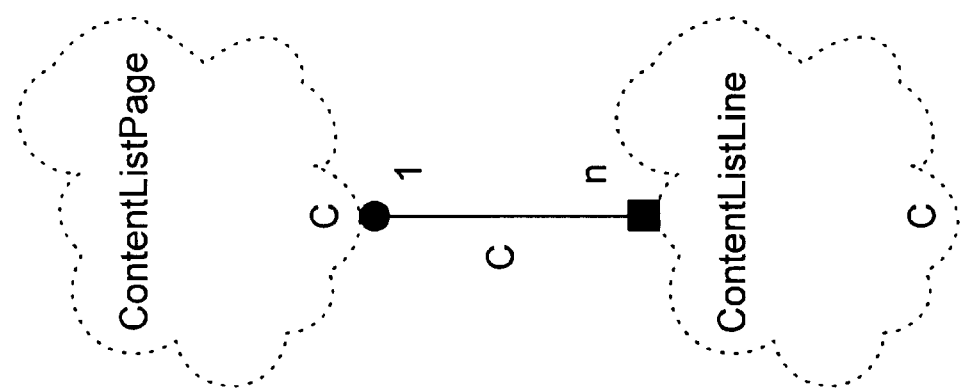
Figure 21:
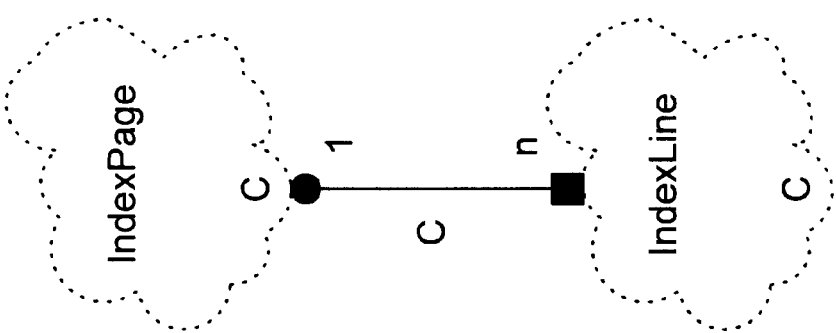
Figure 20:
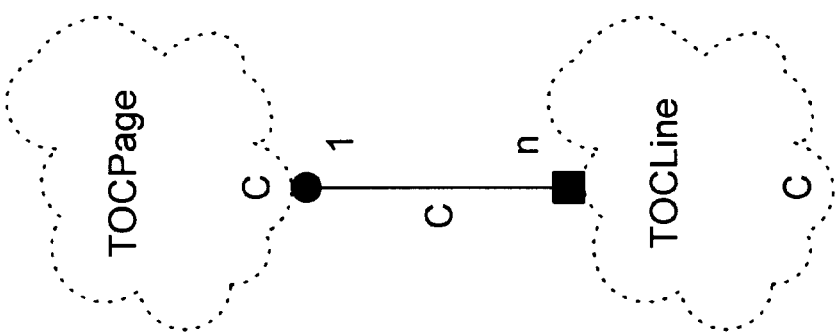

FIGS. 20–22 provide further details regarding the TOCPage, IndexPage, and ContentListPage classes of FIG. 11. TOCPage has a "contains by value" reference with TOCLine; IndexPage has a "contains by value" relationship with IndexLine; and ContentListPage has a "contains by value" relationship with the ContentListLine class. These class relationships indicate that each TOCPage has multiple TOCLines, each IndexPage has multiple IndexLines, and each ContentListPage has multiple ContentListLines. The class diagrams of FIGS. 20–22 increase the granularity of the system so that each line on each of the corresponding pages may be separately identified.

Core Functions

FIGS. 11–22 best distinguish between core and extensible functions in the electronic catalog framework of the present invention. Specifically, as noted above, many of the classes in this framework are extensible classes. All class relationships shown in FIGS. 11–22 are core relationships, and may not be modified by a consumer or a user of the framework. In fact, it is the fixed character of these relationships between classes that characterizes a framework and makes it useful and powerful. The core function of the electronic catalog framework is defined by the core classes, the core class relationships, and the functional requirements that cause the framework to behave in the desired manner. As described above with respect to FIG. 9, the overall core function of the electronic catalog framework includes the steps of method 900. Note, however, that not all of the steps of method 900 need be implemented in a particular electronic catalog environment. The various functions of FIG. 9 are core functions not because they are always performed, but because the framework provides support for the implementation of each of these steps. The specific steps that make up any electronic catalog environment depend on how the consumer of the framework extends the classes and defines (or overrides) the appropriate methods.

Object Interaction

Figure 23:
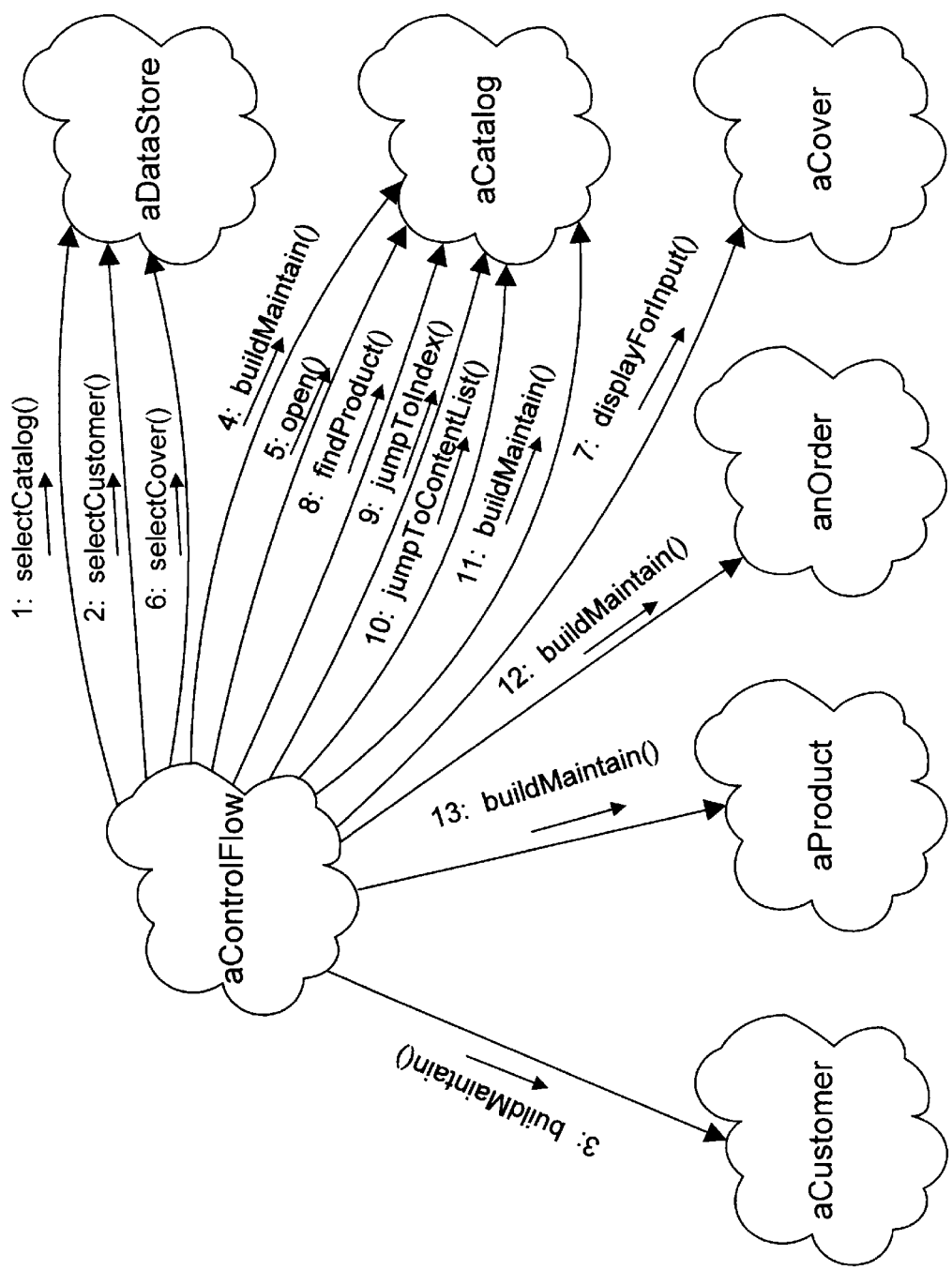
FIG. 23 is an object diagram of one exemplary electronic catalog environment defined by extending the extensible classes of FIGS. 11–22.

The operation of the framework of FIGS. 11–22 may best be understood by the class diagrams of FIGS. 11–22 and the object diagram of FIG. 23. Many different electronic catalog environments may be created by defining concrete subclasses for the extensible classes described above with reference to FIGS. 11–22. If an electronic catalog environment has the same common features with a different environment that is already implemented in the framework, the new environment may use the same subclass without having to duplicate the effort to re-generate the code from scratch. From this we see the power and flexibility of providing an electronic catalog framework. In sum, the framework not only makes the programmer's job easier, but it also makes the code much more portable to other applications, and makes the code much easier to maintain.

The detailed operation of framework 870 in accordance with the present invention will now be illustrated with reference FIG. 23, which is an object diagram of one very simplified sample electronic catalog environment. Note that many of the methods defined in the class diagrams are not shown in the object diagram of FIG. 23. For example, none of the constructor methods are shown. The objects of FIG. 23 will be instantiated at the appropriate time by the appropriate methods, and for this simplified example we show only one particular simplified object interaction. With this in mind, the function of the framework mechanism will now be described with reference to the specific methods referenced in FIG. 23.

A framework consumer will have to define a ControlFlow class and instantiate aControlFlow object as a member of that class. ControlFlow is not part of framework mechanism 870, but invokes many of the methods that allow a flexible manner of defining multiple electronic catalogs. The aControFlow, object first invokes the selectCatalog( ) method on the aDataStore object, specifying the desired catalog (step 1). The aDataStore object returns the requested catalog to aControlFlow, which then invokes the selectCustomer( ) method on aDataStore, specifying the name of the customer that was selected (step 2). aDataStore returns the requested customer information to aControlFlow (or a parameter indicating that the requested customer does not exist in aDataStore). Next, the buildMaintain( ) method on aCustomer is invoked (step 3) to prepare the aCustomer object for use.

Next, the buildMaintain( ) method on aCatalog is created to prepare the catalog for use (step 4). The catalog is then opened by invoking the open( ) method on the acatalog object (step 5). Any desired security check may be part of the opening of the catalog, such as validating the user's right to access the catalog by invoking the checkPassword( ) method on an AccessProfile object corresponding to the user. Once the catalog is open, invoking the selectCover( ) method (step 6) selects which cover will be used, and the displayForInput( ) method on aCover is invoked (step 7) to display the selected cover to the user. Once the catalog is open, a user may perform actions with the catalog user interface that result in the aControlFlow object invoking the findProduct( ) method (step 8), the jumpToIndex( ) method (step 9), the jumpToContentList( ) method (step 10), and the jumpToTOC( ) method (step 11). Steps 8–11 are shown to illustrate the types of functions that a user may invoke through aControlFlow on the aCatalog object while dealing with an electronic catalog, and no significance should be attached to their sequence (or even presence) other than being used to illustrate how a user might interact with the electronic catalog framework.

When a customer (i.e., user) gets ready to order something, the user causes the anOrder object to be instantiated. For example, if the user has reviewed the pick list and is satisfied that it has all the product that the user wants to order, the user may click on a "submit order" button that transfers the pick list to an order. At this point the anOrder object will be instantiated. Later, the buildMaintain( ) method may be used to update or maintain the order (step 12).

Generally many products will be created when the catalog is first being defined. However, not all products will have associated objects that exist at the same time. Only those products that need to be instantiated will have corresponding objects. At some point the framework consumer may invoke the buildMaintain( ) method on the aProduct object to prepare it for use (step 13).

As the example above illustrates, the electronic catalog framework provides an extremely flexible and powerful tool for implementing any number of electronic catalog environments for electronic catalogs or electronic catalog development tools by simply defining classes that implement the features specific to a particular electronic catalog environment. A framework consumer may extend the framework in a number of different ways to implement a desired electronic catalog environment. For example, an external search engine and/or security package may be specified. Different payment methods for orders may be supported. Related products may be linked together, such as automotive oil and oil filters, popcorn and salt, etc. Products that were previously browsed or purchased may be stored for later viewing b) the user. Of course, many numerous examples of extensions may be conceived, and the list above is given to simply illustrate the great power and flexibility provided by electronic catalog framework 870.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims. Note that the term "framework consumer" as used in the specification and the claims denotes any human programmer or any software program that is capable of extending the framework mechanism to define a particular electronic catalog environment, and that the term "user" refers to any human or software program that interacts with an electronic catalog that is created by extending the extensible portions of electronic catalog framework 870.

What is claimed is:

1. An apparatus comprising:

at least one processor;

a memory coupled to the at least one processor;

an object-oriented framework mechanism residing in the memory and executed by the at least one processor that provides at least one electronic catalog environment for generating at least one electronic catalog that is displayed to a user, wherein the electronic catalog environment comprises:

at least one core function defined by at least one core class and by the relationships between a plurality of classes within the framework mechanism, wherein the implementation of the at least one core function is defined by the framework mechanism and cannot be modified by a consumer of the framework mechanism and cannot be modified by a consumer of the framework mechanism;

at least one extensible function defined by at least one extensible class, wherein the implementation of the at least one extensible function is defined by the consumer of the framework mechanism by extending the at least one extensible class;

at least one content page that is displayed to a user that is an extensible class of the framework mechanism; and a cover page that is displayed to a user that includes at least one link to at least one content page, the cover page comprising an extensible class of the framework mechanism.

2. The apparatus of claim 1 wherein the electronic catalog environment further comprises:

at least one customer that may shop using the electronic catalog;

at least one product offered to the at least one customer; and at least one order placed by a customer for at least one product.

3. The apparatus of claim 1 wherein the electronic catalog environment further comprises:

a jacket page;

at least one table of contents page;

at least one index page; and at least one content list page.

4. The apparatus of claim 1 wherein the framework mechanism comprises an order class and an order item class, the order item class defining:

at least one order item object corresponding to at least one of a plurality of order items; and a second set of object methods to create at least one of the order items; the order class defining:

at least one order object corresponding to at least ore of the plurality of orders, each order object including a plurality of the order items; and a third set of object methods to retrieve at least one of the order items from at least one of the order objects.

5. The apparatus of claim 1 wherein the framework mechanism comprises:

an order input class, the order input class defining:

at least one order input object; and
a fourth set of object methods for reading at least one of the orders;
an order output class, the order output class defining:
at least one order output object; and
a fifth set of object methods for outputting information regarding one of the orders after processing.

6. The apparatus of claim 1 wherein the framework mechanism comprises:
an exploder class, the exploder class defining:
at least one exploder object; and
a sixth set of object methods for exploding at least one of the plurality of order items;
a validator class, the validator class defining:
at least one validator object; and
a seventh set of object methods for validating each of the plurality of order entries;
a link generator class, the link generator class defining:
at least one link generator object; and
an eighth set of object methods for generating relationship links between selected order items;
a test data class, the test data class defining:
at least one test data object; and
a ninth set of object methods for generating test data for each of the plurality of orders.

7. The apparatus of claim 1 wherein the framework mechanism further comprises an order class and an order item class, the order item class defining:
at least one order item object corresponding to at least one of a plurality of order items; and
a second set of object methods to create at least one of the order items; the order class defining:
at least one order object corresponding to at least one of the plurality of orders, each order object including a plurality of the order items; and
a third set of object methods to retrieve at least one of the order items from at least one of the order objects.

8. The apparatus of claim 7 wherein the third set of object methods includes at least one object method that adds at least one of the order items to the order object.

9. The apparatus of claim 7 wherein the order class and the order item class are core classes of the framework mechanism, the implementation of which cannot be changed by a user.

10. The apparatus of claim 7 wherein the framework mechanism further comprises:
an order input class, the order input class defining:
at least one order input object; and
a fourth set of object methods for reading at least one of the orders;
an order output class, the order output class defining:
at least one order output object; and
a fifth set of object methods for outputting information regarding one of the orders after processing.

11. The apparatus of claim 10 wherein the framework mechanism further comprises:
an exploder class, the exploder class defining:
at least one exploder object; and
a sixth set of object methods for exploding at least one of the plurality of order items;
a validator class, the validator class defining:
at least one validator object; and
a seventh set of object methods for validating each of the plurality of order entries;
a link generator class, the link generator class defining:
at least one link generator object; and
an eighth set of object method for generating relationship links between selected order items;
a test data class, the test data class defining:
at least one test data object; and
a ninth set of object methods for generating test data for each of the plurality of orders.

12. The apparatus of claim 11 wherein the order input class, the order output class, the exploder class, the validator class, the link generator class, and the test data class are extensible classes of the framework mechanism, the implementation of which by a user defines the at least one electronic catalog environment.

13. The apparatus of claim 11 wherein the configuration process class has a "has a" relationship with the order input class, the order output class, the exploder class, the validator class, the link generator class, and the test data class.

14. The aparatus of claim 1 wherein the main memory contains an application program that supports an object oriented programming environment containing the framework mechanism, and wherein the framework mechanism is extended by providing information that implements the at least one electronic catalog environment.

15. The apparatus of claim 1 wherein the framework mechanism comprises:
at least one core function defined by at least one core class and by the relationships between a plurality of classes within the framework mechanism, wherein the implementation of the at least one core function is defined by the framework mechanism and cannot be modified by a user of the framework mechanism; and
at least one extensible function defined by at least one extensible class, wherein the implementation of the at least one extensible function is defined by the user of the framework mechanism by extending the at least one extensible class.

16. The apparatus of claim 15 wherein the table of contents page class is an extensible class of the framework mechanism, the implementation of which by a framework consumer at least partially defines the electronic catalog; environment.

17. The apparatus of claim 1 wherein the framework mechanism comprises:
an index page class, the index page class defining:
at least one index page object corresponding to at least one of a plurality of index pages; and
a seventh set of object methods to create and move among the plurality of index pages.

18. The apparatus of claim 17 wherein the index page c ass is an extensible class of the framework mechanism, the implementation of which by a framework consumer at least partially defines the electronic catalog environment.

19. The apparatus of claim 1 wherein the framework mechanism comprises:
a content list page class, the content list page class defining:
at least one content list page object corresponding to at least one of a plurality of content list pages; and
an eighth set of object methods to create and move among the plurality of content list pages.

20. The apparatus of claim 19 wherein the content list page class is an extensible class of the framework mechanism, the implementation of which by a framework consumer at least partially defines the electronic catalog environment.

21. The apparatus of claim 1 wherein the framework mechanism comprises:

a cover class, the cover class defining:
   at least one cover object; and
   a ninth set of object methods to display information in the cover object to a user of the apparatus.

22. The apparatus of claim 21 wherein the cover class is an extensible class of the framework mechanism, the implementation of which by a framework consumer at least partially defines the electronic catalog environment.

23. The apparatus of claim 1 wherein the framework mechanism comprises:
   a jacket class, the jacket class defining:
     at least one jacket object; and
     a tenth set of object methods to display information in the jacket object to a user of the apparatus.

24. The apparatus of claim 23 wherein the jacket class is an extensible class of the framework mechanism, the implementation of which by a framework consumer at least partially defines the electronic catalog environment.

25. The apparatus of claim 4 wherein the framework mechanism comprises a customer class, the customer class defining:
   at least one customer object corresponding to a purchaser; and
   a second set of object methods to create and modify a list of products to purchase.

26. The apparatus of claim 25 wherein the framework mechanism comprises a product class, the product class defining:
   at least one product object corresponding to at least one of a plurality of products; and
   a third set of object methods to locate and display the plurality of products.

27. The apparatus of claim 26 wherein the framework mechanism comprises an order class, the order class defining:
   at least one order object corresponding to an order for at least one product; and
   a fourth set of object methods to create and modify a list of products corresponding to the order.

28. The apparatus of claim 27 wherein the framework mechanism further comprises a content page class, the content page class defining:
   at least one content page object corresponding to at least one of a plurality of content pages; and
   a fifth set of object methods to create and move among the plurality of content pages.

29. The apparatus of claim 28 wherein the framework mechanism further comprises:
   a table of contents page class, the table of contents page class defining:
     at least one table of contents page object corresponding to at least one of a plurality of table of contents pages; and
     a sixth set of object methods to create and move among the plurality of table of contents pages.

30. The apparatus of claim 29 wherein the framework mechanism further comprises:
   an index page class, the index page class defining:
     at least one index page object corresponding to at least one of a plurality of index pages; and
     a seventh set of object methods to create and move among the plurality of index pages.

31. The apparatus of claim 30 wherein the framework mechanism further comprises:
   a content list page class, the content list page class defining:
     at least one content list page object; and
     an eighth set of object methods to create and move among a plurality of content list pages;
   a cover class, the cover class defining:
     at least one cover object; and
     a ninth set of object methods to display information in the cover object to a user of the apparatus;
   a jacket class, the jacket class defining:
     at least one jacket object; and
     a tenth set of object methods to display information in the jacket object to a user of the apparatus.

32. The apparatus of claim 31 wherein the catalog class, the customer class, the product class, the order class, the content page class, the table of contents page class, the index page class, the content list page class, the cover class, and the jacket class are extensible classes of the framework mechanism, the implementation of which by a framework consumer defines the at least one electronic catalog environment.

33. The apparatus of claim 30 wherein the catalog class contains each of the content page class, the table of contents page class, the index page class, the content list page class, the cover class, and the jacket class.

34. The apparatus of claim 1 wherein the memory contains an application program that supports an object oriented programming environment containing the framework mechanism, and wherein the framework mechanism is extended by providing information that implements the at least one electronic catalog environment.

35. A method for providing an electronic catalog containing a plurality of pages, the method comprising the steps of:
   providing an extensible object oriented framework mechanism that defines the electronic catalog according to extended portions of the framework mechanism that are customized to provide a desired electronic catalog environment;
   extending the framework mechanism to define the desired electronic catalog environment, the step of extending the framework mechanism including the steps of:
     generating at least one content page that is displayed to a user;
     generating a cover page that is displayed to a user that includes at least one link to at least one content page; and
   executing the extended object oriented framework mechanism on an apparatus.

36. The method of claim 35 further including the steps of:
identifying at least one customer that may shop using the electronic catalog environment;
displaying at least one product to the at least one customer; and
generating at least one order placed by a customer for the at least one product.

37. The method of claim 35 further including the steps of:
generating a jacket;
generating at least one table of contents page;
generating at least one index page; and
generating at least one content list page.

38. The method of claim 37 further including the steps of:
selecting a catalog;
displaying the jacket for the selected catalog to a user of the framework mechanism;
opening the selected catalog;
displaying the at least one table of contents page to the user;

displaying the at least one index page to the user; and
displaying the at least one content list page to the user.

39. The method of claim 38 further including the steps of:
creating a pick list of products listed on the at least one content page;
determining from the pick list the products to be ordered;
submitting an order for the products to be ordered.

40. A program product comprising:
an object-oriented framework mechanism for providing an electronic catalog containing a plurality of pages, the framework mechanism including an extensible electronic catalog mechanism that is defined by extended portions of the framework mechanism, the framework mechanism comprising:
a catalog object corresponding to the electronic catalog mechanism; and
a first set of object methods on the catalog object to perform a plurality of predetermined functions to display an electronic catalog to a user; and
signal bearing media bearing the framework mechanism.

41. A program product comprising:
(A) an object oriented framework mechanism for processing a plurality of orders, the framework mechanism including: a configuration process object corresponding to the at least one electronic catalog environment, the configuration process object including a first set of object methods on the configuration process object to perform a plurality of predetermined functions to implement the electronic catalog environment; an order item object, the order item object including a second set of object methods to create at least one of the order items; an order object, the order object corresponding to at least one of the plurality of orders, each order object including a plurality of the order items and including a third set of object methods to retrieve at least one of the order items from at least one of the order objects; an order input object including a fourth set of object methods for reading at least one of the orders; an order output object including a fifth set of object methods for outputting information regarding one of the orders after processing; an exploder object including a sixth set of object methods for exploding at least one of the plurality of order items; a validator object including a seventh set of object methods for validating each of the plurality of order entries; a link generator object including an eighth set of object methods for generating relationship links between selected order items; and a test data object including a ninth set of object methods for generating test data for each of the plurality of orders; wherein the object oriented framework mechanism processes at least one of the plurality of orders according to extended portions of the framework mechanism that are customized to provide the desired electronic catalog environment; and
(B) signal bearing media bearing the object oriented framework mechanism.

42. The program product of claim 40 wherein the signal bearing media comprises transmission media.

43. The program product of claim 40 wherein the first set of object methods includes:
at least one object method that displays information to a user of the apparatus;
at least one object method that retrieves at least one of the plurality of pages;
at least one object method that generates information regarding at least one of the plurality of pages;
at least one object method that allows a user to search the contents of the catalog object; and
at least one object method that allows the user to move between the plurality of pages.

44. The program product of claim 40 wherein the
at least one catalog object corresponding to the at least one electronic catalog environment contains a plurality of pages.

45. The program product of claim 40 wherein the framework mechanism comprises:
at least one customer object corresponding to a purchaser; and
a second set of object methods to create and modify a list of products to purchase.

46. The program product of claim 40 wherein the framework mechanism comprises:
at least one product object corresponding to at least one of a plurality of products; and
a third set of object methods to locate and display the plurality of products.

47. The program product of claim 40 wherein the framework mechanism comprises:
at least one order object corresponding to an order for at least one product; and
a fourth set of object methods to create and modify a list of products corresponding to the order.

48. The program product of claim 40 wherein the framework mechanism comprises:
at least one content page object corresponding to at least one of a plurality of content pages; and
a fifth set of object methods to create and move among the plurality of content pages.

49. The program product of claim 40 wherein the framework mechanism comprises:
at least one table of contents page object corresponding to at least one of a plurality of table of contents pages; and
a sixth set of object methods to create and move among the plurality of table of contents pages.

50. The program product of claim 40 wherein the framework mechanism further comprises:
at least one index page object corresponding to at least one of a plurality of index pages; and
a seventh set of object methods to create and move among the plurality of index pages.

51. The program product of claim 40 wherein the framework mechanism further comprises:
at least one content list page object;
an eighth set of object methods to create and move among a plurality of content list pages;
at least one cover object;
a ninth set of object methods to display information in the cover object to a user of the apparatus;
at least one jacket object; and
a tenth set of object methods to display information in the jacket object to a user of the apparatus.

52. An apparatus comprising:
at least one processor;
a memory coupled to the at least one processor;
an object oriented framework mechanism residing in the memory, the framework mechanism comprising:
at least one catalog object corresponding to the at least one electronic catalog environment, the catalog object containing a plurality of pages;

a first set of object methods to perform a plurality of predetermined functions to implement the at least one electronic catalog environment;

at least one customer object corresponding to a purchaser;

a second set of object methods to create and modify a list of products to purchase;

at least one product object corresponding to at least one of a plurality of products;

a third set of object methods to locate and display the plurality of products;

at least one order object corresponding to an order for at least one product;

a fourth set of object methods to create and modify a list of products corresponding to the order;

at least one content page object corresponding to at least one of a plurality of content pages;

a fifth set of object methods to create and move among the plurality of content pages;

at least one table of contents page object corresponding to at least one of a plurality of table of contents pages;

a sixth set of object methods to create and move among the plurality of table of contents pages;

at least one index page object corresponding to at least one of a plurality of index pages;

a seventh set of object methods to create and move among the plurality of index pages;

at least one content list page object;

an eighth set of object methods to create and move among a plurality of content list pages;

at least one cover object;

a ninth set of object methods to display information in the cover object to a user of the apparatus;

at least one jacket object; and a tenth set of object methods to display information in the jacket object to a user of the apparatus.

53. The object oriented framework mechanism of claim 52 wherein the framework mechanism comprises:

at least one core function defined by relationships between a plurality of classes within the framework mechanism, wherein the implementation of the at least one core function is defined by the framework mechanism and cannot be modified by a consumer of the framework mechanism and cannot be modified by a user of the framework mechanism; and at least one extensible function defined by at least one extensible class, wherein the implementation of the at least one extensible function is defined by the consumer of the framework mechanism by extending the at least one extensible class.

54. A method for providing an electronic catalog environment defined by an object oriented framework mechanism, the method comprising the steps of:

providing at least one catalog object corresponding to the at least one electronic catalog environment, the catalog object containing a plurality of pages;

providing a first set of object methods to perform a plurality of predetermined functions to implement the at least one electronic catalog environment;

providing at least one customer object corresponding to a purchaser;

providing a second set of object methods to create and modify a list of products to purchase;

providing at least one product object corresponding to at least one of a plurality of products;

providing a third set of object methods to locate and display the plurality of products;

providing at least one order object corresponding to an order for at least one product;

providing a fourth set of object methods to create and modify a list of products corresponding to the order;

providing at least one content page object corresponding to at least one of a plurality of content pages;

providing a fifth set of object methods to create and move among the plurality of content pages;

providing at least one table of contents page object corresponding to at least one of a plurality of table of contents pages;

providing a sixth set of object methods to create and move among the plurality of table of contents pages;

providing at least one index page object corresponding to at least one of a plurality of index pages;

providing a seventh set of object methods to create and move among the plurality of index pages;

providing at least one content list page object;

providing an eighth set of object methods to create and move among a plurality of content list pages;

providing at least one cover object;

providing a ninth set of object methods to display information in the cover object to a user of the apparatus;

providing at least one jacket object;

providing a tenth set of object methods to display information in the jacket object to a user of the apparatus; and executing the objects and object methods on an apparatus to allow the user to view at least one of the plurality of pages.

55. The method of claim 54 further including the step of:

extending the framework mechanism to define the desired electronic catalog environment.

56. A program product comprising:

(A) an object oriented framework mechanism for providing an electronic catalog environment including at least one catalog object containing a plurality of pages, and a first set of object methods to perform a plurality of predetermined functions to implement the at least one electronic catalog environment; at least one customer object corresponding to a purchaser and a second set of object methods to create and modify a list of products to purchase; at least one product object corresponding to at least one of a plurality of products and a third set of object methods to locate and display the plurality of products; at least one order object corresponding to an order for at least one product and a fourth set of object methods to create and modify a list of products corresponding to the order; at least one content page object corresponding to at least one of a plurality of content pages, and a fifth set of object methods to create and move among the plurality of content pages; at least one table of contents page object corresponding to at least one of a plurality of table of contents pages, and a sixth set of object methods to create and move among the plurality of table of contents pages; at least one index page object corresponding to at least one of a plurality of index pages, and a seventh set of object methods to create and move among the plurality of index pages; at least one content list page object, and an eighth set of object methods to create and move among a plurality of content list pages; at least one cover object, and a ninth set of object methods to display information in the cover object to a user; at least one jacket object, and a tenth set of object methods to display information in the jacket object to a user; wherein the object oriented framework mechanism defines at least one electronic catalog according to extended portions of the framework mechanism that are customized to provide the desired electronic catalog environment; and (B) signal bearing media bearing the object oriented framework mechanism.

57. The program product of claim 56 wherein the signal bearing media comprises recordable media.

58. The program product of claim 56 wherein the signal bearing media comprises transmission media.

59. The program product of claim 56 wherein the catalog class, the customer class, the product class, the order class, the content page class, the table of contents page class, the index page class, the content list page class, the cover class, and the jacket class are extensible classes of the framework mechanism, the implementation of which by a framework consumer defines the at least one electronic catalog environment.

60. A method for providing an electronic catalog using an apparatus having a central processing unit and a memory, the memory having an application program that provides an object oriented programming environment, the method comprising the steps of:

(A) providing in the program an object oriented framework mechanism that defines the electronic catalog according to extended portions of the framework mechanism that are customized to provide a desired electronic catalog environment, the framework mechanism including:

a set of core functions wherein the implementation of the core functions is defined by the framework mechanism and cannot be modified by a consumer of the framework mechanism and cannot be modified by a user of the framework mechanism; and a set of extensible functions wherein the implementation of the extensible functions is defined by the consumer of the framework mechanism;

(B) extending the extensible functions in the framework mechanism to define particular classes having predetermined protocols and defining particular object methods that define the electronic catalog, the extensible functions defining the desired electronic catalog environment;

(C) generating an executable electronic catalog by integrating together the extensible functions and the core functions; and (D) executing the executable electronic catalog on the apparatus to define the electronic catalog environment.

61. The method of claim 60 further including the steps of:

generating at least one content page; and generating a cover.

62. The method of claim 61 further including the steps of:

generating a jacket;

generating at least one table of contents page;

generating at least one index page; and generating at least one content list page.

63. The method of claim 62 further including the steps of:

selecting a catalog;

displaying the jacket for the selected catalog to a user of the framework mechanism;

opening the selected catalog;

displaying the at least one table of contents page to the user;

displaying the at least one index page to the user; and displaying the at least one content list page to the user.

64. The method of claim 63 further including the steps of:

creating a pick list of products listed on the at least one content page;

determining from the pick list the products to be ordered;

submitting an order for the products to be ordered.

* * * * *

UNITED STATES PATENT AND TRADEMARK OFFICE
CERTIFICATE OF CORRECTION

PATENT NO. : 6,052,670
DATED : Apr. 18, 2000
INVENTOR(S) : Verlyn Mark Johnson

It is certified that error appears in the above-identified patent and that said Letters Patent is hereby corrected as shown below:

Claim 4, Col. 26, Line 58, "ore" should be --one--.

Claim 14, Col. 28, Line 18, "aparatus" should be --apparatus--.

Claim 16, Col. 28, Line 40, "catalog;" should be --catalog--.

Claim 18, Col. 28, Line 49, delete "c".

Claim 18, Col. 28, Line 50, "ass" should be --class--.

Signed and Sealed this

Twenty-seventh Day of February, 2001

Attest:

NICHOLAS P. GODICI

Attesting Officer     Acting Director of the United States Patent and Trademark Office